(12) United States Patent
Takahashi et al.

(10) Patent No.: US 9,250,102 B2
(45) Date of Patent: Feb. 2, 2016

(54) MAGNETIC ENCODER

(75) Inventors: Toru Takahashi, Iwata (JP); Shintarou Ueno, Iwata (JP); Pascal Desbiolles, Thorens-Glières (FR); Cyril Peterschmitt, La Balme de Sillingy (FR)

(73) Assignee: NTN CORPORATION, Osaka (JP)

( * ) Notice: Subject to any disclaimer, the term of this patent is extended or adjusted under 35 U.S.C. 154(b) by 358 days.

(21) Appl. No.: 13/700,833

(22) PCT Filed: May 25, 2011

(86) PCT No.: PCT/JP2011/062027
§ 371 (c)(1),
(2), (4) Date: Nov. 29, 2012

(87) PCT Pub. No.: WO2011/152266
PCT Pub. Date: Dec. 8, 2011

(65) Prior Publication Data
US 2013/0063138 A1 Mar. 14, 2013

(30) Foreign Application Priority Data
Jun. 3, 2010 (JP) .................................. 2010-127768

(51) Int. Cl.
G01B 7/30 (2006.01)
G01D 5/244 (2006.01)
G01D 5/245 (2006.01)

(52) U.S. Cl.
CPC .......... *G01D 5/24438* (2013.01); *G01D 5/2451* (2013.01)

(58) Field of Classification Search
CPC ... G01P 15/0802; G01P 15/125; G01P 3/443; G01P 3/487; G01P 2015/0837; G01P 13/04; G01D 5/2451

USPC ............. 324/207.11, 207.13, 207.14, 207.22, 324/207.25; 384/446; 301/6.5
See application file for complete search history.

(56) References Cited

U.S. PATENT DOCUMENTS 4,274,053 A 6/1981 Ito et al.
4,319,188 A * 3/1982 Ito et al. ......................... 324/173
(Continued)

FOREIGN PATENT DOCUMENTS

CN 101213424 A 7/2008
CN 100491922 C 5/2009
(Continued)

OTHER PUBLICATIONS

International Search Report of International Application No. PCT/JP2011/062027 mailed Jul. 5, 2011.
(Continued)

*Primary Examiner* — Tung X Nguyen
*Assistant Examiner* — Adam Clarke

(57) ABSTRACT

Provided is a magnetic encoder which includes plural rows of magnetic encoder tracks. One magnetic encoder track of the magnetic encoder tracks includes magnetic pattern magnetized thereto to generate signals of equal pitch for detection of rotation. The magnetized magnetic pattern includes N poles and S poles arranged in alternate fashion. The magnetic encoder is configured to be employed spaced through an air gap from sensors that read magnetic signals of the respective magnetic encoder tracks. The magnetic encoder track is configured such that the magnetic pattern thereof acting on position of the corresponding sensor is, under the interference of magnetism of the plural rows of magnetic encoder tracks, detected by the corresponding sensor as an equal pitch magnetic pattern.

13 Claims, 18 Drawing Sheets

(56) References Cited

U.S. PATENT DOCUMENTS

| | | | |
|---|---|---|---|
| 4,713,613 A * | 12/1987 | Takahashi et al. | 324/207.22 |
| 4,785,241 A * | 11/1988 | Abiko et al. | 324/207.21 |
| 4,810,967 A * | 3/1989 | Yokoyama et al. | 324/207.2 |
| 4,851,771 A | 7/1989 | Ikeda et al. | |
| 5,019,776 A * | 5/1991 | Kawamata et al. | 324/207.12 |
| 5,430,373 A * | 7/1995 | Ichikawa et al. | 324/207.21 |
| 5,898,301 A | 4/1999 | La Croix et al. | |
| 6,294,910 B1 | 9/2001 | Travostino et al. | |
| 6,559,633 B1 * | 5/2003 | Nachtigal et al. | 324/174 |
| 6,700,367 B1 | 3/2004 | Santos et al. | |
| 6,857,782 B2 * | 2/2005 | Norimatsu | 384/448 |
| 7,023,203 B2 * | 4/2006 | Miyashita et al. | 324/207.25 |
| 7,508,193 B2 * | 3/2009 | Yarimizu et al. | 324/174 |
| 7,667,455 B2 | 2/2010 | Sugiyama et al. | |
| 7,923,993 B2 | 4/2011 | Takahashi et al. | |
| 2006/0049821 A1 * | 3/2006 | Fayaud et al. | 324/167 |
| 2008/0061771 A1 * | 3/2008 | Sugiyama et al. | 324/207.25 |
| 2009/0315544 A1 | 12/2009 | Takahashi et al. | |
| 2010/0176801 A1 | 7/2010 | Aruga et al. | |
| 2010/0225309 A1 * | 9/2010 | Takahashi et al. | 324/207.25 |
| 2011/0101964 A1 | 5/2011 | Ausserlechner et al. | |
| 2011/0158570 A1 * | 6/2011 | Takahashi et al. | 384/446 |
| 2011/0291646 A1 * | 12/2011 | Musha et al. | 324/207.11 |
| 2015/0253153 A1 * | 9/2015 | Smithanik | G01D 5/2013 324/207.25 |

FOREIGN PATENT DOCUMENTS

| | | |
|---|---|---|
| FR | 2930637 | 10/2009 |
| JP | 1-297507 | 11/1989 |
| JP | 3-223620 | 10/1991 |
| JP | 6-58766 | 3/1994 |
| JP | 09-43260 | 2/1997 |
| JP | 2001-518608 | 10/2001 |
| JP | 2002-512687 | 4/2002 |
| JP | 2002-541485 | 12/2002 |
| JP | 4024472 | 10/2007 |
| JP | 2008267868 * | 6/2008 |
| JP | 2008-233069 | 10/2008 |
| JP | 2008-267867 | 11/2008 |
| JP | 2008-267868 | 11/2008 |
| WO | WO 98/45667 | 10/1998 |
| WO | WO 2008/129872 A1 | 10/2008 |
| WO | WO 2010/029742 | 3/2010 |

OTHER PUBLICATIONS

International Preliminary Report on Patentability mailed Jan. 17, 2013, issued in corresponding PCT Patent Application No. PCT/JP2011/062027.

Extended European Search Report dated Jul. 2, 2014 in corresponding European Patent Application No. 11789675.3.

Chinese Office Action issued on Aug. 26, 2014 in corresponding Chinese Patent Application No. 201180027195.3.

* cited by examiner

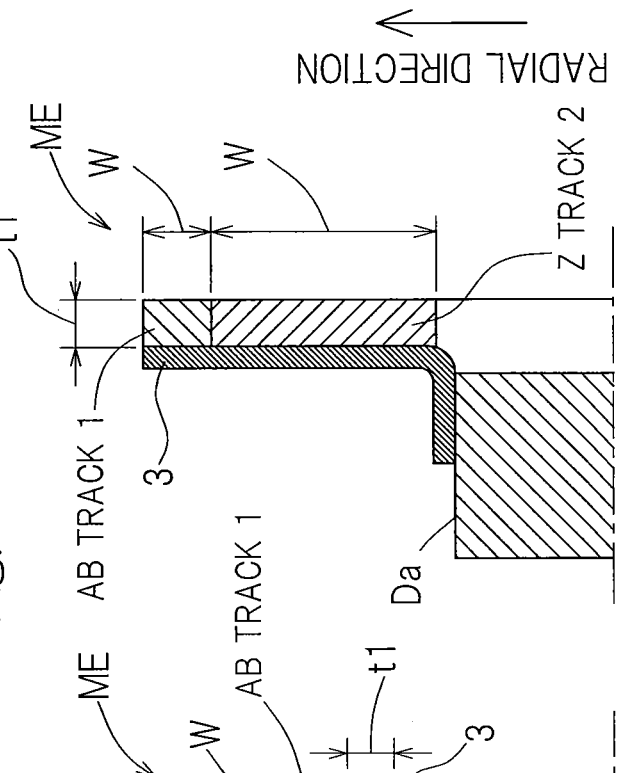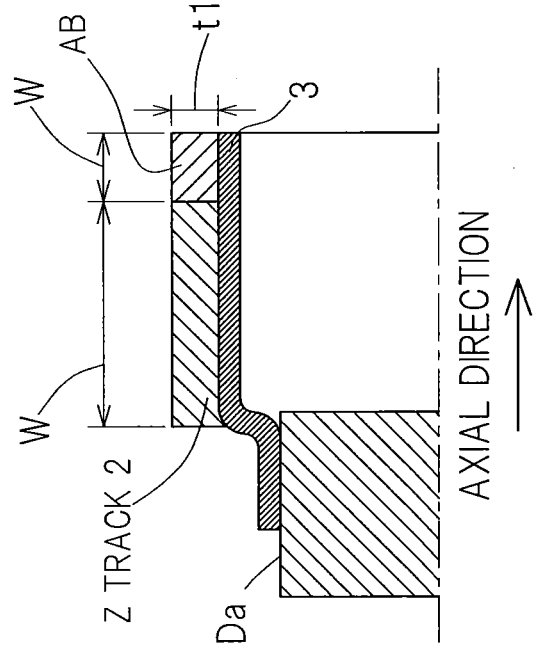

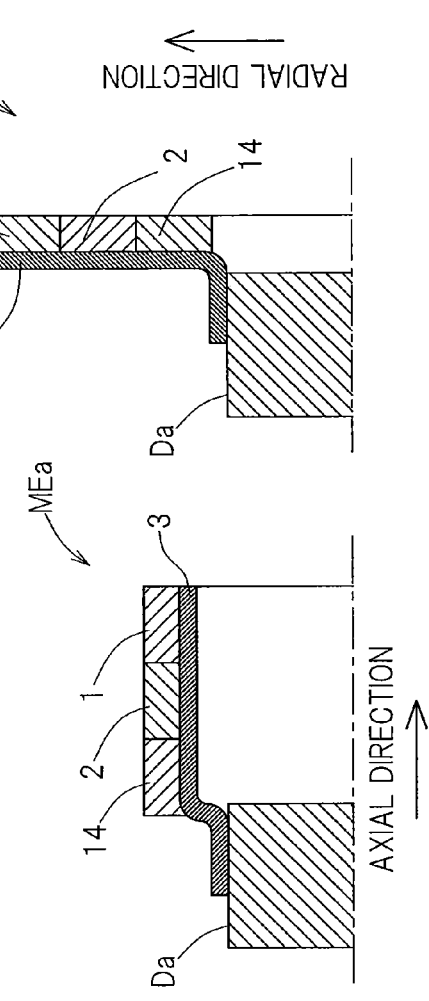
Fig. 18A
Fig. 18B
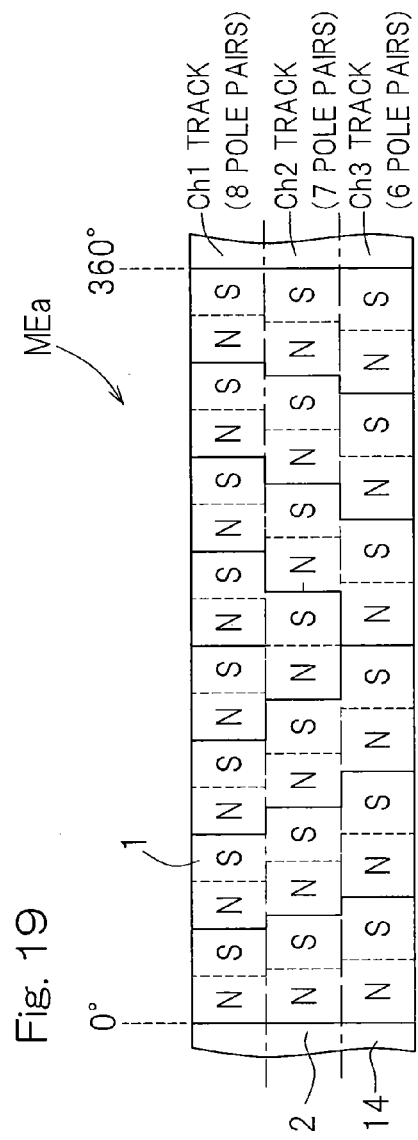
Fig. 19

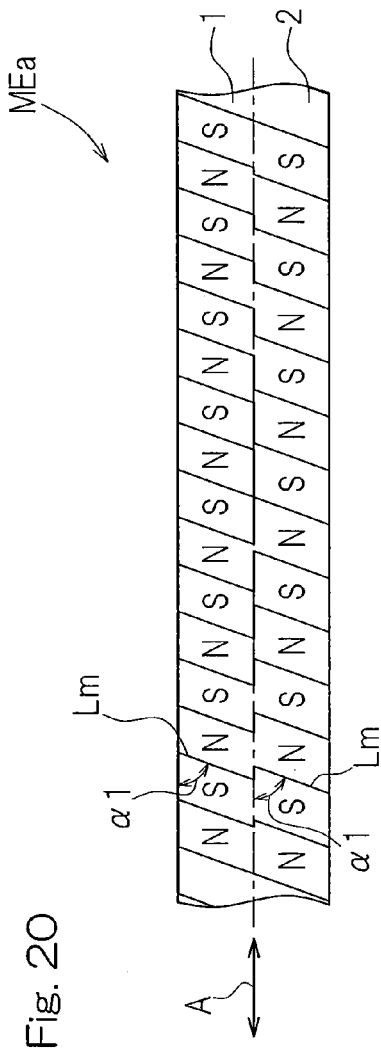
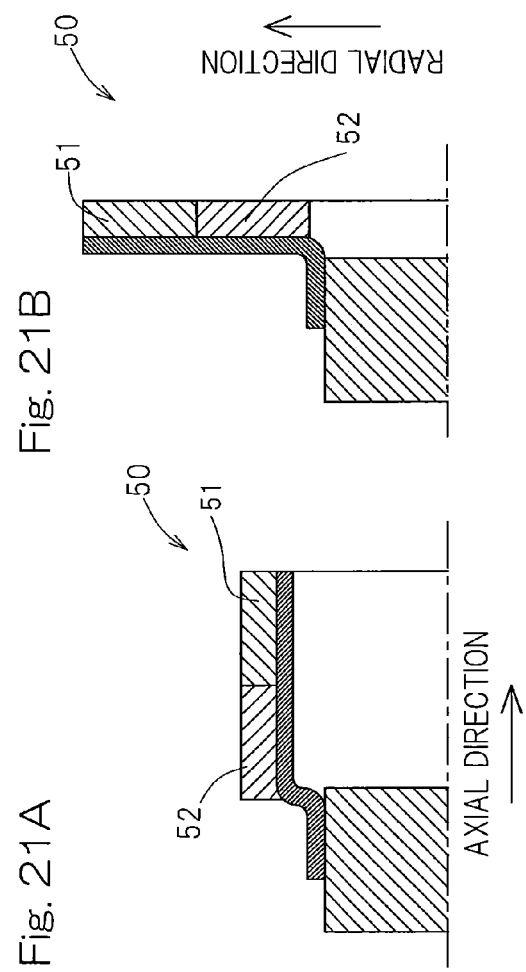

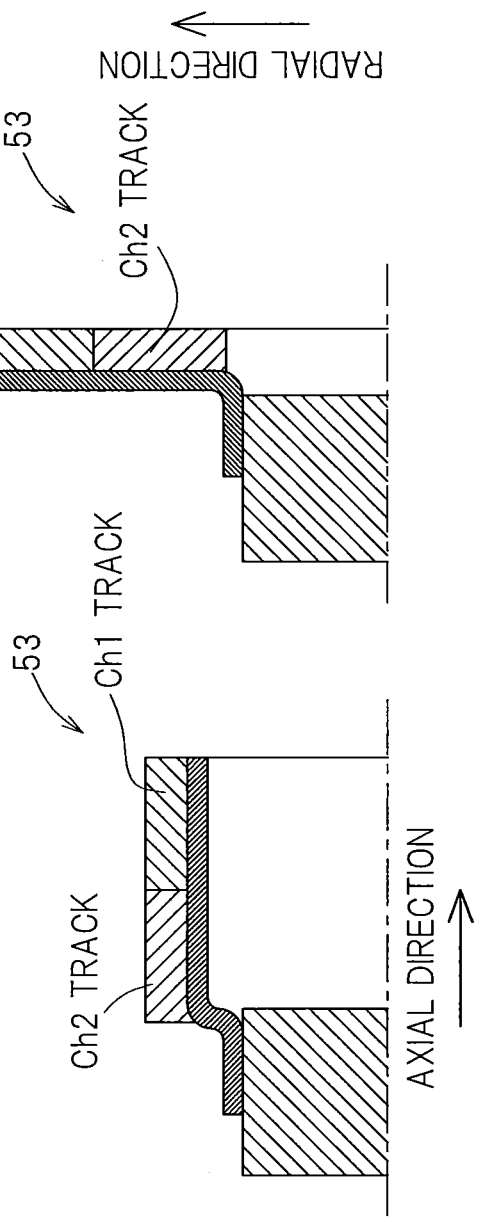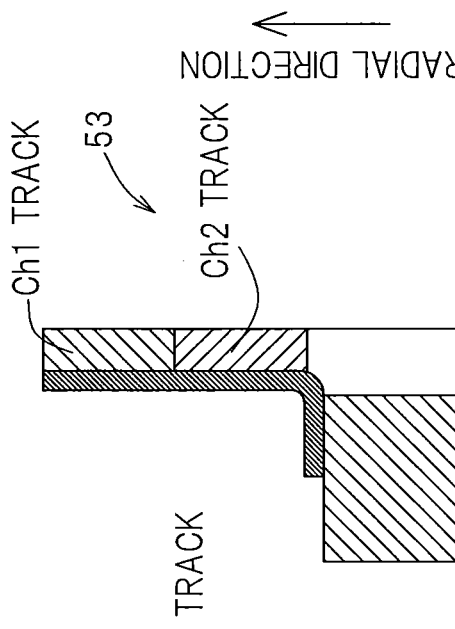

MAGNETIC ENCODER

CROSS REFERENCE TO THE RELATED APPLICATIONS

This application is a U.S. national stage application of PCT/JP2011/062027 filed May 25, 2011 and claims the foreign priority of Japanese patent application No. 2010-127768, filed Jun. 3, 2010, the entire disclosures of which are herein incorporated by reference as a part of this application.

BACKGROUND OF THE INVENTION

1. Field of the Invention

The present invention relates to a magnetic encoder which may be used to detect rotation, rotational angles, and linear movements of various devices.

2. Description of Related Art

A technique that belongs to the field of bearing elements is disclosed which makes use of magnetic sensors arranged in the form of a line to obtain interpolated pulse signals (see the Patent Documents 1 and 2 listed below). A technique is disclosed which makes use of a magnetic drum having different numbers of magnetic pole pairs per complete rotation and of a plurality of magnetic sensors to calculate absolute angles (see the Patent Document 3 listed below). A rotational angles detection device is disclosed which makes use of magnetic sensors such as disclosed in the Patent Documents 1 and 2 to obtain phase difference between two different magnetic encoders and which uses the phase difference to calculate absolute angles (see the Patent Document 4 listed below). A technique is disclosed which makes use of a magnetic encoder such as employed in the Patent Document 4 and which interposes a gap between plural rows of adjacent magnetic tracks (see the Patent Document 5 listed below). A technique is disclosed which makes use of a magnetic encoder such as employed in the Patent Document 4 and which interposes a magnetic material between plural rows of adjacent magnetic tracks (see the Patent Document 6 listed below). A technique is disclosed which manufactures a magnetic encoder that includes a plurality of magnetic poles formed thereto (see the Patent Document 7 listed below). A technique is disclosed which relates to, with respect to a magnetic encoder such as disclosed in the Patent Documents 1 and 2, plural rows of tracks that are out of phase from each other (see the Patent Document 8 listed below).

PRIOR ART DOCUMENT

Patent Document

[Patent Document 1] JP Laid-open Patent Publication No. 2001-518608
[Patent Document 2] JP Laid-open Patent Publication No. 2002-541485
[Patent Document 3] JP Laid-open Patent Publication No. H06-058766
[Patent Document 4] JP Laid-open Patent Publication No. 2008-233069
[Patent Document 5] JP Laid-open Patent Publication No. 2008-267867
[Patent Document 6] JP Laid-open Patent Publication No. 2008-267868
[Patent Document 7] JP Patent No. 4024472
[Patent Document 8] JP Laid-open Patent Publication No. 2002-512687

SUMMARY OF THE INVENTION

A plural-row magnetic encoder is often used to provide a rotation sensor or an angle sensor for control of a rotational device. In this case, reduction of the space between the plural magnetic tracks may lead to increase in magnetic interference between the magnetic tracks, thereby resulting in reduced detection sensitivity. Such undesirable effects of magnetic interference may be greater when the plural rows of magnetic tracks are brought closer as well as when magnetic sensors are positioned at locations closer to a boundary line defined between the plural rows of magnetic tracks. Also, for successful incorporation of the sensors into a device, a sufficient air gap may be required between a magnetic encoder—which is a rotational member—and sensors—which are stationary members, to safely prevent possible failures that may be caused by, for example, an accidental contact.

A separator made of a magnetic material may be interposed between the plural rows of magnetic tracks to reduce such magnetic interference. However, this may complicate the construction of a magnetic encoder, leading to increase in the production cost. Also, a magnetic material may short-circuit part of magnetic field emanating from a magnetic encoder, thereby leading to reduced magnetic force at sensors. Increased distance between the magnetic tracks may reduce magnetic interference, but this may require a larger mounting space, preventing reduction in the size of a detection device.

In practice, a minimum arrangement space for sensors may be preferred in order to reduce the size of a device. Hence, for proper incorporation, a magnetic encoder may be required which includes plural rows of tracks formed within a narrow width of 2 mm to 10 mm, approximately. The incorporation of such a magnetic encoder may need to be such that an air gap in the range of 0.3 mm to 4 mm, approximately, will be ensured between the surface of the magnetic encoder and the sensors. Various factors such as mechanical tolerances and operating environments often make it difficult to realize a narrower gap between the surface of the magnetic encoder and the sensors. Also, it is often preferred that the sensors be arranged at positions that correspond to a proximity to the centers of the respective tracks, since, as far as the magnetic field strength detected by the sensors is concerned, the strongest magnetic force emanates from the centers of the widths of the respective tracks as measured along the direction of rotation of the respective tracks. Hence, a demand has exited for a plural-row magnetic encoder which, despite the aforementioned constraints, allows sensors to be positioned where sufficient magnetic field strength is ensured so that they can accurately read precision magnetic signals. To answer such a demand, however, magnetic patterns formed on the plural rows of magnetic tracks had to be such that they define a possibly clearest boundary between them to prevent them from influencing each other, so that precision magnetic signals are ensured at the sensors' detecting positions.

FIG. 21A shows a longitudinal cross sectional view of a conventional radial-type magnetic encoder 50, while FIG. 21B shows a longitudinal cross sectional view of a conventional axial-type magnetic encoder 50. FIG. 22A shows the magnetization of the surfaces of the magnetic tracks of the magnetic encoder 50, to which desired magnetic patterns have been magnetized. FIG. 22B shows the magnetic patterns detected by sensors that are arranged spaced through an air gap of 1 mm from the magnetic encoder 50 of FIG. 22A. As shown in FIG. 22B, the magnetization in a proximity to the boundary between the tracks 51, 52 shows a gradual transition on detected magnetic patterns. Thus, information provided by magnetic sensors that read signals of the respective tracks 51, 52 will be of lower accuracy. Despite ideal magnetization on the surfaces of magnetic tracks such as shown in FIG. 22A, with a larger air gap, information actually detected by magnetic sensors, which have read signals of the respective tracks, will be of lower accuracy, since they are more susceptible to the influence of the signals of the other tracks. Possible measures to prevent such lower accuracy are listed below, along with their alleged disadvantages.

A configuration of positioning sensors over the respective tracks at locations that are remote from the other tracks may be effective. However, this may go against space savings. This may also lead to increased widths W of plural rows of magnetic encoder tracks. Thus, such a configuration may make it difficult to reduce the size of a magnetic encoder.

A configuration of reducing an air gap to such an extent that the influence of one track relative to the other track becomes small may be effective. However, the acceptable range of such an air gap is limited, thus in turn limiting the number of operable configurations.

A configuration of interposing a magnetic material, groove(s), and/or un-magnetized zone(s) between plural rows of magnetic encoder tracks may lead to reduction in the influence of one track relative to the other track. However, this may complicate the construction of a magnetic encoder, leading to increase in the production cost.

FIG. 23A shows a longitudinal cross sectional view of a conventional radial-type magnetic encoder 53, while FIG. 23B shows a longitudinal cross sectional view of a conventional axial-type magnetic encoder 53. FIGS. 24A and 24B illustrate a plural-row magnetic encoder 53 such as disclosed in the Patent Document 4, while FIG. 25 illustrates a general concept of errors. For convenience, the illustrated magnetic encoder is an ideally magnetized, namely, error-free magnetic encoder which includes Ch1 and Ch2 tracks having eight and seven pairs of magnetic poles, respectively. The air gap is 1 mm. FIGS. 24A and 24B illustrate the magnetic patterns on the Ch1 track and Ch2 track, respectively, and each of them is assumed to contain no errors because of ideal magnetization.

As shown in FIG. 25, as the respective tracks approach each other, the magnetic patterns thereof acting on positions of the corresponding sensors are actually detected by the corresponding sensors as containing error patterns that include errors brought by the interference of magnetism of the respective tracks having different numbers of magnetic pole pairs. Such an error pattern indicates offset from an ideally magnetized magnetic pattern.

Both of the respective tracks are aligned with each other at angle=0° on an N pole. The Ch1 track is affected by the interference of magnetism from the magnetic pattern on the Ch2 track. In the illustrated example, the magnetic pattern on the Ch2 track has magnetic pole pairs, each being larger than each of the magnetic pole pairs of the magnetic pattern on the Ch1 track. Hence, each of the magnetic pole pairs (or magnetic pole pairs operating on the actual position of the corresponding sensor) on the Ch1 track has a longer apparent length, thus producing an error of positive polarity. The error shows an increase, up to the point where angle=90°. In contrast, the error shows a decrease where angle is in the range of 90° to 180° and becomes zero at around where angle=180°. This is because the offset between the magnetic pattern on the Ch1 track and the magnetic pattern on the Ch2 track gradually accumulates until it reaches the point of inversion, from where each of the magnetic pole pairs on the Ch1 track has a shorter apparent length. Each of the error patterns per complete rotation is sinusoidal. The error pattern on the Ch2 track has a property that is inverse to that of the error pattern on the Ch1 track.

The more magnetic pole pairs a magnetic encoder includes, the more approximate to a sinusoidal wave each of the error patterns becomes. Such errors may change according to the following parameters:

A smaller value for the air gap may reduce the errors. However, this may require components to be assembled with each other with precision and may jeopardize the freedom of adjustment of the air gap from magnetic sensors, thus limiting the number of assembly options available.

The errors may be minimized by separating the plural rows of tracks from each other or by inserting a magnetic material between adjacent tracks. However, a configuration of separating the plural rows of tracks may prevent reduction in the size of a magnetic encoder. A magnetic encoder including a magnetic material interposed between adjacent tracks may be difficult to manufacture, thus increasing the production cost.

It may be conceivable to increase the space between magnetic sensors that read signals of the plural rows of tracks. However, this may prevent reduction of the size of a detection device.

An object of the present invention is to provide a magnetic encoder of reduced size and simplified construction that includes plural rows of magnetic encoder tracks, which enables accurate detection, by sensor(s), of signals of equal pitch for detection of rotation under the interference of magnetism between the tracks, while at the same time ensuring a desired air gap.

A magnetic encoder according to the first aspect of the present invention is a magnetic encoder which includes plural rows of magnetic encoder tracks that are arranged adjacent to each other and are formed integrally with the magnetic encoder, at least one magnetic encoder track of the magnetic encoder tracks including a magnetic pattern having N poles and S poles arranged in alternate fashion magnetized thereto to generate signals of equal pitch for detection of rotation, the magnetic pattern, the magnetic encoder being configured to be employed spaced through an air gap from sensors that read magnetic signals of the respective magnetic encoder tracks, the at least one magnetic encoder track being configured such that the magnetic pattern thereof acting on position of the corresponding sensor is, under an interference of magnetism of the plural rows of magnetic encoder tracks, detected by the corresponding sensor as an equal pitch magnetic pattern.

When desired magnetic patterns are formed on the surfaces of the respective rows of a magnetic encoder, the magnetic patterns actually detected by sensors at positions corresponding to the desired air gap will be offset from ideal magnetic patterns. This is caused by plural rows of magnetic encoder tracks being brought close to be integral with each other such that magnetism of the magnetic patterns magnetized to the respective rows interferes with each other.

In this configuration, the at least one magnetic encoder track is configured such that the magnetic pattern thereof acting on position of the corresponding sensor is, under the interference of magnetism of plural rows of magnetic encoder tracks, detected by the corresponding sensor as an equal pitch magnetic pattern. In this way, the interference of magnetism of plural rows of magnetic encoder tracks can be used to achieve detection of an equal pitch magnetic pattern by corresponding sensor(s) at its/their actual detecting position(s), while also ensuring a desired air gap and without the need to complicate the construction of a magnetic encoder. Thus, despite the presence of plural rows of magnetic encoder tracks, corresponding sensor(s) can accurately detect signals of equal pitch for detection of rotation. This configuration eliminates the need to provide or makes it optional to provide a space between plural rows of magnetic encoder tracks or to provide interposition of, for example, a magnetic material between the tracks. In this way, the construction of a magnetic encoder can be simplified, thereby leading to reduction in the production cost of the magnetic encoder and/or reduction in the size of the magnetic encoder.

The plural rows of magnetic encoder tracks may include the plural rows of magnetic encoder tracks include a magnetic encoder track that is different from the one magnetic encoder track and is adjacent to the one magnetic encoder track, the different magnetic encoder track including a magnetic pattern magnetized thereto to provide a reference position for rotation, the magnetic pattern magnetized to the different magnetic encoder track having the same number of magnetic poles as the one magnetic encoder track, and a phase offset with respect to the magnetic pattern magnetized to the one magnetic encoder track, and the different magnetic encoder track being configured to provide, by the use of the phase offset with respect to the magnetic pattern magnetized to the one magnetic encoder track, the reference position for rotation.

The plural rows of magnetic encoder tracks may include a magnetic encoder track that is different from the one magnetic encoder track and is adjacent to the one magnetic encoder track, the different magnetic encoder track including a magnetic pattern magnetized thereto to provide a reference position for rotation, the magnetic pattern magnetized to the different magnetic encoder track including that has an N or S magnetic pole at a certain circumferential location with the remaining circumferential portion being not magnetized. The plural rows of magnetic encoder tracks may include a magnetic encoder track that is different from the one magnetic encoder track and is adjacent to the one magnetic encoder track, the different magnetic encoder track including a magnetic pattern magnetized thereto to provide a reference position for rotation, the magnetic pattern magnetized to the different magnetic encoder track including an N or S magnetic pole at a certain circumferential location as well as a magnetic pole, which is an opposite magnetic pole to the magnetic pole on the certain circumferential location, at a different circumferential location.

Each of the magnetic encoder tracks may be formed to have a track width as measured along arrangement direction of the magnetic encoder tracks, with the track width being in the range of 1 mm to 5 mm. The term "arrangement direction" used herein refers to a direction that is parallel to a rotation axis of a magnetic encoder or a direction that is perpendicular to a rotation axis of a magnetic encoder. The selection of the air gap affects the magnetic field strength detected by the sensors. In this configuration, the magnetic encoder tracks have respective track widths as measured along the arrangement direction that are in the range of 1 mm to 5 mm, thereby enabling proper detection of magnetic signals of the respective magnetic encoder tracks.

The plural rows of magnetic encoder tracks may be adjacent through a boundary line, with the magnetic encoder being configured to be employed spaced from the sensors through an air gap that is more than 0.3 mm and is less than 4 mm and with the sensors having respective detector portions positioned over the respective magnetic encoder tracks at locations spaced from the boundary line towards the respective magnetic encoder tracks by respective distances in the range of 0.5 mm to 3 mm. In a configuration where the sensors have respective detector portions positioned over the respective magnetic encoder tracks at locations spaced from the boundary line towards the respective magnetic encoder tracks by respective distances in the range of 0.5 mm to 3 mm, when the air gap is equal to or less than 0.3 mm, sensor(s) may accidentally contact with magnetic encoder track(s) which contain(s), for example, rubber or resin, thus damaging the surface of the magnetic encoder track(s). Also, a foreign material may be easily trapped between magnetic encoder track(s) and sensor(s), thus damaging the surface of the magnetic encoder track(s). When the air gap is equal to or more than 4 mm, reduced magnetization strength is inevitable and proper control of the interference of magnetism between plural rows of magnetic encoder tracks will be difficult. This makes it hard for sensor(s) to generate precise magnetic field signals at its/their detecting position(s).

The magnetic encoder tracks may include magnetic encoder track(s) including a rare earth sintered magnet, a magnet containing a rare earth magnet powder mixed in a rubber or resin, the magnetic encoder track includes a ferrite sintered magnet or a magnet containing a ferrite power mixed in a rubber or a resin, the magnetic encoder track having a thickness that is more than 0.5 mm and is less than 4 mm. When the magnetic encoder tracks have thickness equal to or less than 0.5 mm, considerable demagnetizing field will be formed inside the respective magnetic encoder tracks. This leads to higher chance of causing irreversible flux loss at high temperatures, thereby resulting in reduced reliability as a magnet. When the magnetic encoder track has thickness equal to or more than 4 mm, this makes it difficult to pass a sufficient amount of flux for magnetization through the magnetic encoder track(s) since the distance between magnetization heads increases. In the configuration under discussion, however, the respective thickness of the magnetic encoder track is more than 0.5 mm. This leads to formation of smaller demagnetizing field inside the respective magnetic encoder tracks. This also leads to lower chance of causing irreversible flux loss at high temperatures, thereby resulting in improved reliability as a magnet.

The magnetic pattern magnetized to the one magnetic encoder track may include magnetic poles, each having a length L as measured along a circumferential direction of the magnetic encoder track, the length L being in the range of 0.3 mm to 5 mm, and wherein each of the magnetic encoder tracks is so formed that the length L has a relationship with a track width W, as measured along arrangement direction of the magnetic encoder tracks, of W>L. The relationship of W>L can minimize the unwanted effects of possible errors brought by the interference of magnetism between the plural rows of magnetic encoder tracks. Also, the length L of each magnetic pole being in the range of 0.3 mm to 5 mm enables necessary and sufficient detection of magnetic signals of the respective magnetic encoder tracks.

The plural rows of the adjacent magnetic encoder tracks may include respective magnetic patterns magnetized thereto having different numbers of magnetic poles, with the magnetic pattern magnetized to the at least one magnetic encoder track being such an unequal pitch magnetic pattern that the magnetic pattern thereof acting on position of the corresponding sensor is, under the interference of magnetism of plural rows of magnetic encoder tracks, detected by the corresponding sensor as an equal pitch magnetic pattern.

As the plural rows of magnetic encoder tracks approach each other, the magnetic patterns thereof acting on positions of the corresponding sensors are actually detected by the corresponding sensors as containing error patterns that include errors brought by the interference of magnetism of the respective tracks having different numbers of magnetic pole pairs. In the configuration under discussion, the magnetic pattern magnetized to the at least one magnetic encoder track is such an unequal pitch magnetic pattern that the magnetic pattern thereof acting on position of the corresponding sensor is, under the interference of magnetism of plural rows of magnetic encoder tracks, detected by the corresponding sensor as an equal pitch magnetic pattern. The plural rows of magnetic encoder tracks are brought close to be integral with each other, causing interference of magnetism between the respective magnetic encoder tracks such that the interference generally cancels each other's error patterns and reduces errors. In this way, the magnetic pattern that operates on position of the sensor may be detected by the corresponding sensor at its actual detecting position as magnetic pattern that are closer to ideal, error-free magnetic pattern. This enables, despite the presence of plural rows of magnetic encoder tracks, accurate detection, by the sensor, of signals of equal pitch for detection of rotation.

Magnetic material(s) may be further provided so as to be interposed between the plural rows of the adjacent magnetic encoder tracks. A core having the plural rows of magnetic encoder tracks disposed thereon may be further provided, with the plural rows of the adjacent magnetic encoder tracks having gap interposed therebetween. Any one of these configurations can further enhance the effect or advantage of the interference of magnetism between the respective magnetic encoder tracks that generally cancels each other's error patterns.

The plural rows of magnetic encoder tracks may include a magnetic encoder track that is different from the one magnetic encoder track and is adjacent to the one magnetic encoder track, the one magnetic encoder track has a track width as measured along arrangement direction of the magnetic encoder tracks, and the different, adjacent magnetic encoder track has a track width, as measured along arrangement direction of the magnetic encoder tracks, different from the track width of the one magnetic encoder track. This provides freedom in arrangement of sensors, thereby facilitating the incorporation of a magnetic encoder into a device. The plural rows of the adjacent magnetic encoder tracks may include respective detected surfaces extending on different planes.

A magnetic encoder according to the second aspect of the present invention is a magnetic encoder which includes plural rows of linear magnetic encoder tracks that are arranged adjacent to each other and are formed integrally with the magnetic encoder, with at least one magnetic encoder track of the magnetic encoder tracks including a magnetic pattern magnetized thereto to generate signals of equal pitch for detection of speed and with the magnetized magnetic pattern including N poles and S poles arranged in alternate fashion. The magnetic encoder is configured to be employed spaced through an air gap from sensors that read magnetic signals of the respective magnetic encoder tracks. The at least one magnetic encoder track is configured such that the magnetic pattern thereof acting on position of the corresponding sensor is, under the interference of magnetism of plural rows of magnetic encoder tracks, detected by the corresponding sensor as an equal pitch magnetic pattern.

A plural-row magnetic encoder according to present invention may be applied to a linear motion encoder. In this case, too, at least one magnetic encoder track is configured such that the magnetic pattern thereof acting on position of the corresponding sensor is, under the interference of magnetism of plural rows of magnetic encoder tracks, detected by the corresponding sensor as an equal pitch magnetic pattern. In this way, the interference of magnetism of plural rows of magnetic encoder tracks can be used to achieve detection of an equal pitch magnetic pattern by corresponding sensor(s) at its/their actual detecting position(s), while also ensuring a desired air gap and without the need to complicate the construction of a magnetic encoder. Thus, despite the presence of plural rows of magnetic encoder tracks, corresponding sensor(s) can accurately detect signals of equal pitch. The configuration under discussion eliminates the need to provide or makes it optional to provide a space between plural rows of magnetic encoder tracks or to provide interposition of, for example, a magnetic material between the tracks. In this way, the construction of a magnetic encoder can be simplified, thereby leading to reduction in the production cost of the magnetic encoder and/or reduction in the size of the magnetic encoder.

The present invention encompasses any combination of at least two features disclosed in the claims and/or the specification and/or the drawings. In particular, the present invention encompasses any combination of at least two features in the claims.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 3A shows a longitudinal cross sectional view of a radial-type magnetic encoder according to the second embodiment of the present invention;

FIG. 3B shows a longitudinal cross sectional view of an axial-type magnetic encoder according to the second embodiment of the present invention;

FIG. 18A shows a longitudinal cross sectional view of a radial-type magnetic encoder according to the fourteenth embodiment of the present invention;

FIG. 18B shows a longitudinal cross sectional view of an axial-type magnetic encoder according to the fourteenth embodiment of the present invention;

FIG. 19 shows an example of the magnetic patterns magnetized to a magnetic encoder according to the fifteenth embodiment of the present invention;

FIG. 20 shows an example of the magnetic patterns magnetized to a magnetic encoder according to the sixteenth embodiment of the present invention;

FIG. 21A shows a longitudinal cross sectional view of a conventional radial-type magnetic encoder;

FIG. 21B shows a longitudinal cross sectional view of a conventional axial-type magnetic encoder;

FIG. 23A shows a longitudinal cross sectional view of a conventional radial-type magnetic encoder;

FIG. 23B shows a longitudinal cross sectional view of a conventional axial-type magnetic encoder;

DESCRIPTION OF THE EMBODIMENTS

Figure 1A:
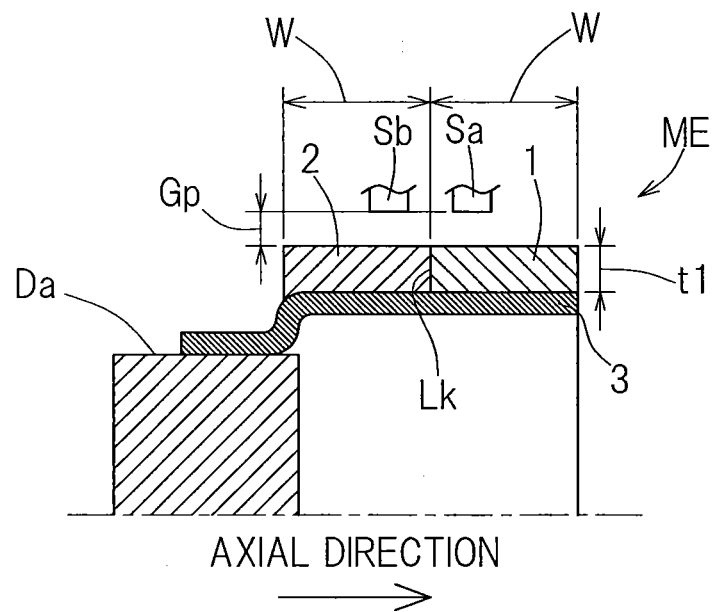
FIG. 1A shows a longitudinal cross sectional view of a radial-type magnetic encoder according to the first embodiment of the present invention.
Figure 1B:
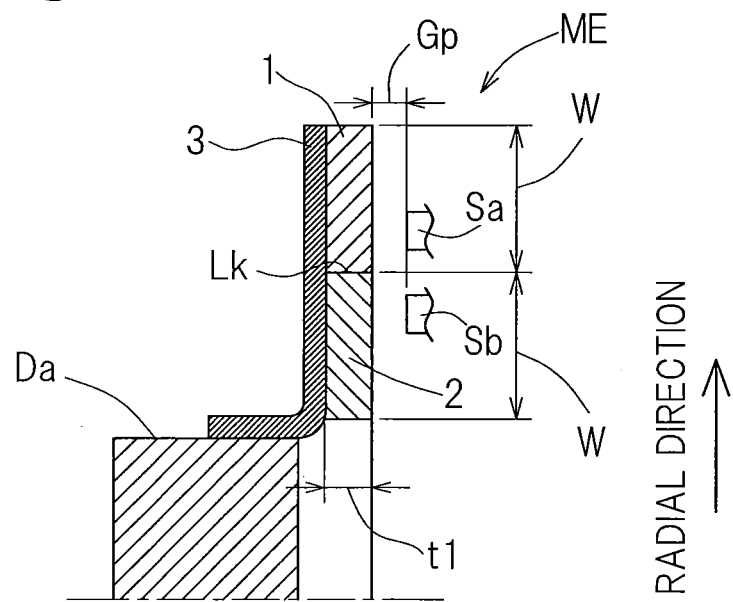
FIG. 1B shows a longitudinal cross sectional view of an axial-type magnetic encoder according to the first embodiment of the present invention.
Figure 2:
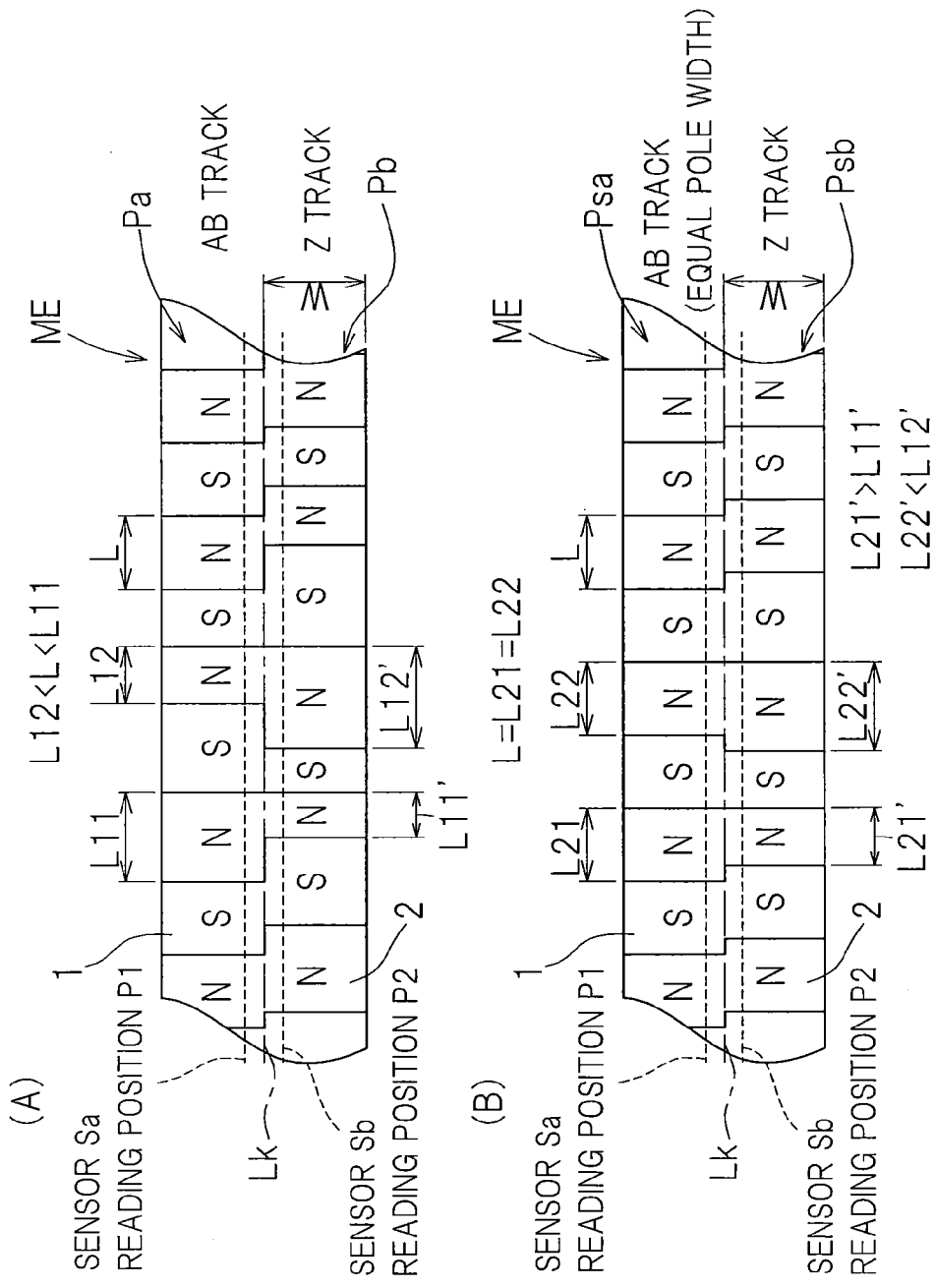
FIG. 2 shows diagram (A) illustrating magnetic patterns magnetized to the surfaces of tracks of the magnetic encoder, and diagram (B) illustrating the magnetic patterns on the magnetic encoder detected at positions corresponding to a desired air gap.

The first embodiment of the present invention will be described in connection with FIGS. 1A and 1B, and FIG. 2 showing diagrams (A) and (B). A magnetic encoder according to this embodiment may be used, for example, to detect rotation, rotational angles, and linear movements of various devices.

As shown in FIGS. 1A and 1B, a magnetic encoder ME includes plural rows of annular magnetic encoder tracks 1, 2 that are arranged adjacent to each other and are formed integrally with the magnetic encoder ME. The magnetic encoder tracks 1, 2 are disposed on a disc-shaped (FIG. 1B) or cylindrical (FIG. 1A) core 3 such that the magnetic encoder tracks 1, 2 are arranged coaxially and adjacent to each other on a surface of the core 3. As shown in FIG. 1B, a magnetic encoder ME that includes, for example, a magnetized, axial-type, annular magnetic body may be attached to an outer peripheral surface Da of, for example, a rotational raceway member of a bearing, with a cylindrical segment of the core 3 being force-fitted to the outer peripheral surface Da. The magnetic encoder tracks 1, 2 include, for example, a rubber, plastic, or a sintered element containing a magnetic power therein, that are magnetized as a rubber magnet, a plastic magnet or a sintered magnet, respectively. It is to be noted that the annular magnetic body is not limited to an axial-type, annular magnetic body; for example, the annular magnetic body may be a radial-type, annular magnetic body such as shown in FIG. 1A.

The magnetic encoder tracks 1, 2 include a magnet containing ferrite that is sinter-molded (i.e. so-called a ferrite sintered magnet), or a molded magnet containing a ferrite magnetic power mixed in a rubber or resin. The material for the magnet may include a rare earth magnet, but ferrite is more advantageous under regular operating conditions, since ferrite is inexpensive and can be easily magnetized. In the embodiment under discussion, as shown in diagram (A) of FIG. 2, each of the magnetic encoder tracks 1, 2 includes N poles and S poles magnetized thereto in alternate fashion along a circumferential direction of the each magnetic encoder track 1, 2. As shown in FIG. 1A and FIG. 1B, the magnetic encoder ME is employed and arranged such that the respective detected surfaces thereof are spaced apart through an air gap Gp from sensors Sa, Sb that read magnetic signals of the respective magnetic encoder tracks 1, 2, with the air gap Gp being more than 0.3 mm and less than 4 mm. As shown in diagrams (A) and (B) of FIG. 2, the plural rows of magnetic encoder tracks 1, 2 are adjacent through a boundary line Lk. The sensors Sa, Sb have respective detector portions that are positioned over the respective magnetic encoder tracks 1, 2 at locations spaced from the boundary line Lk towards the respective magnetic encoder tracks 1, 2 by respective distances in the range of 0.5 mm to 3 mm. The detector portions of the sensors Sa, Sb are positioned at respective sensor reading positions P1, P2 as depicted by broken lines in diagrams (A) and (B) of FIG. 2.

Each of the magnetic encoder tracks 1, 2 has a track width W in the range of 1 mm to 5 mm and includes magnetic poles, each having a length L in the range of 0.3 mm to 5 mm. The track width W refers to a track width as measured along arrangement direction of the tracks that is perpendicular to the direction of rotation of the magnetic encoder ME. The magnetic pole length L refers to the length of each of the magnetic poles of a magnetic pattern, as measured along the direction of rotation of the magnetic encoder ME. Preferably, the track width W and the magnetic pole length L satisfy the relationship of W>L. The magnetic encoder tracks 1, 2 have respective thicknesses t1 such as shown in FIG. 1A and FIG. 1B, with the respective thicknesses t1 being more than 0.5 mm and less than 4 mm.

Figure 22A:
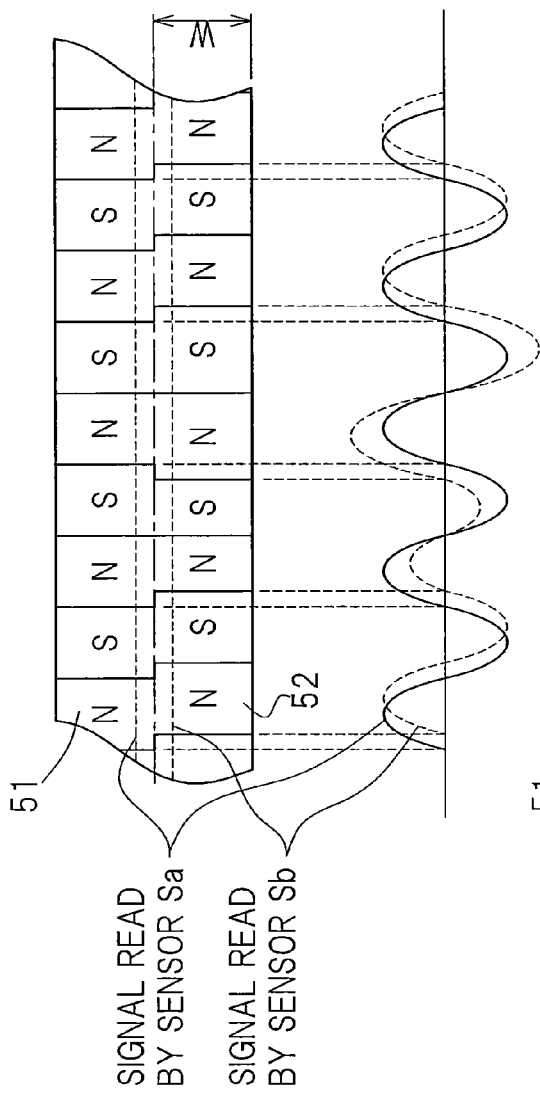
FIG. 22A shows an example of magnetization of the surfaces of magnetic tracks of a magnetic encoder, having desired magnetic patterns magnetized thereto.
Figure 22B:
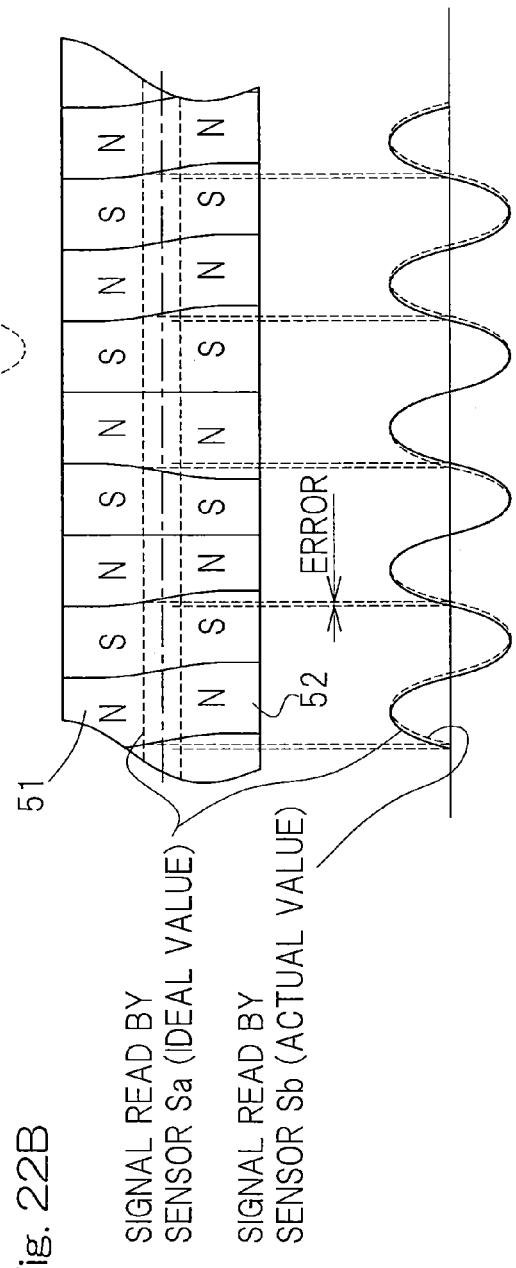
FIG. 22B shows an example of magnetization detected by sensors at positions corresponding to a desired air gap.
Figure 24A:
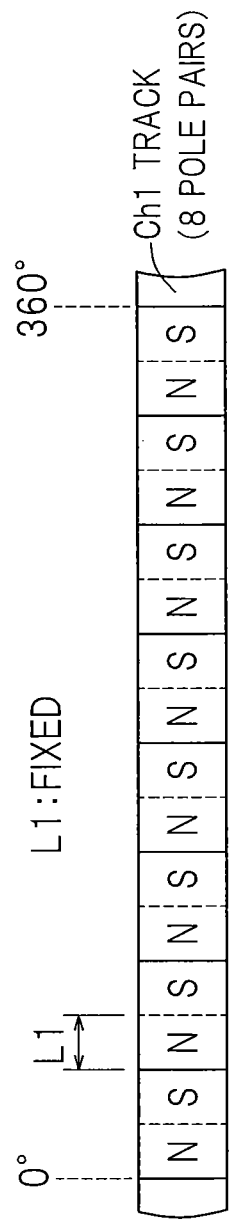
FIG. 24A shows the magnetic pattern magnetized to one of the magnetic encoder tracks of the magnetic encoder.
Figure 24B:
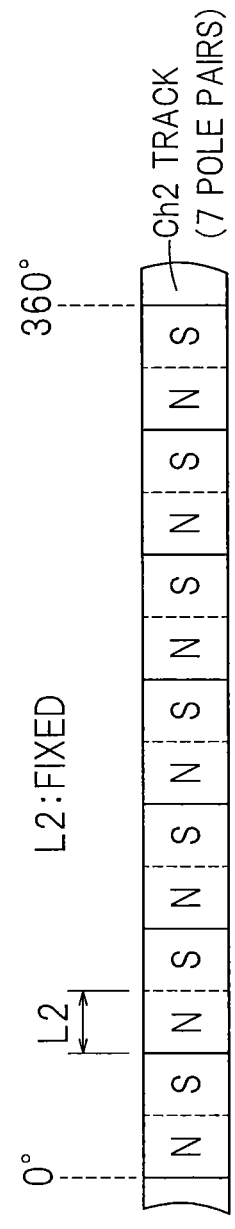
FIG. 24B shows the magnetic pattern magnetized to the other magnetic encoder track of the magnetic encoder tracks of the magnetic encoder.

The magnetization of magnetic patterns will now be described, where the magnetic patterns as shown in FIG. 22A are the desired patterns which will be detected by sensors. Diagram (A) of FIG. 2 shows magnetic patterns magnetized on surface of a magnetic encoder. Diagram (B) of FIG. 2 shows magnetic patterns actually detected by sensors Sa, Sb at locations where the detector portions thereof are positioned.

As shown in diagrams (A) and (B) of FIG. 2, the magnetic encoder ME includes plural rows (two rows in the illustrated example) of annular magnetic encoder tracks 1, 2 that are arranged adjacent to each other and are formed integrally with the magnetic encoder. The magnetic encoder tracks 1, 2 include respective magnetic patterns Pa, Pb magnetized thereto, each including N poles and S poles arranged in alternate fashion. One of the magnetic encoder tracks is an AB track 1 that is employed to generate signals of equal pitch for detection of rotation. The other magnetic encoder track 2 is a Z track that is employed to generate signals indicative of point of origin. The magnetic pattern Pb magnetized to the Z track has the same number of magnetic poles as the AB track. Moreover, the magnetic pattern Pb includes a phase offset with respect to the magnetic pattern Pa magnetized to the AB track.

As shown in diagram (B) of FIG. 2, among the magnetic patterns actually detected by the detector portions Sa, Sb of sensors that confront through an air gap Gp to the magnetic encoder, the AB track is detected as an equal pitch magnetic pattern to generate signals of equal pitch for detection of rotation, where the magnetic pole widths L21, L, L22 are equal to each other. To achieve this result, the magnetic encoder tracks should be formed such that the interference of magnetism of the plural rows of magnetic encoder tracks 1, 2 will result in such patterns as shown in diagram (B) of FIG. 2. In other words, magnetic patterns such as shown in diagram (A) of FIG. 2 are magnetized to surface of the magnetic encoder, which will compensate for the influence brought by the interference of magnetism. More specifically, an unequal pitch magnetic pattern satisfying the relationship of L12<L<L11 is magnetized to the AB track whereby the magnetization pitch of the magnetic pattern Pa is modulated such that the magnetic pattern will be detected as an equal pitch magnetic pattern Psa. On the other hand, a magnetic pattern satisfying the relationship of L11'<L21'<L and L<L22'<L12' is magnetized to the Z track. In other words, the magnetic pattern Pb is modulated to include both magnetic poles with narrower widths and magnetic poles with wider widths as measured along a circumferential direction of the respective poles, such that those poles with narrow widths will be actually detected to be much narrower and those poles with wide widths will be actually detected to be much wider.

The sensor Sa (FIGS. 1A and 1B) that confronts through the air gap Gp to the AB track will output, based on magnetic field signals detected by a magnetic sensor element of the sensor Sa, A-phase pulse signals and B-phase pulse signals, with an A-phase pulse signal and a B-phase pulse signal being out of phase by 90° from each other. The sensor Sb (FIGS. 1A and 1B) that confronts through the air gap Gp to the Z track will output, based on magnetic field signals detected by a magnetic sensor element of the sensor Sb, Z-phase signal(s) indicative of a point of origin. These A-phase, B-phase and Z-phase signals (i.e. ABZ signals) may be out of phase by 90° from each other.

In the above discussed configuration of the magnetic encoder ME, the AB track is configured such that the magnetic pattern thereof acting on position of the sensor Sa is, under the interference of magnetism of plural rows of the AB track and the Z track, detected by the sensor Sa as an equal pitch magnetic pattern Psa. In this way, the interference of magnetism of plural rows of magnetic encoder tracks can be used to achieve detection of an equal pitch magnetic pattern Psa by the sensor Sa at its actual detecting position, while also ensuring a desired air gap Gp and without the need to complicate the construction of a magnetic encoder ME. Despite the presence of the plural rows of the magnetic encoder tracks 1, 2, the sensor Sa can accurately detect signals of equal pitch for detection of rotation. The above discussed configuration eliminates the need to form a space between the plural rows of magnetic encoder tracks 1, 2 or to provide interposition of, for example, a magnetic material between the tracks 1, 2. In this way, the construction of a magnetic encoder ME can be simplified, thereby leading to reduction in the production cost of the magnetic encoder ME and/or reduction in the size of the magnetic encoder ME.

The selection of the air gap Gp affects the magnetic field strength detected by the sensors Sa, Sb. In the above discussed configuration, the magnetic encoder tracks 1, 2 have respective track widths W in the range of 1 mm to 5 mm, thereby enabling detection of magnetic signals of the respective magnetic encoder tracks 1, 2.

When the magnetic encoder tracks 1, 2 have respective thicknesses t1—namely, the thicknesses of magnet portions of the magnetic encoder tracks 1, 2—that are equal to or less than 0.5 mm, considerable demagnetizing field will be formed inside the respective magnetic encoder tracks. This leads to higher chance of causing irreversible flux loss at high temperatures, thereby resulting in reduced reliability as a magnet. When the magnetic encoder tracks 1, 2 have respective thicknesses t1 that are equal to or more than 4 mm, this makes it difficult to pass a sufficient amount of flux for magnetization through the magnetic encoder track between its/their opposite faces.

In contrast, in the above discussed configuration, the respective thicknesses t1 of the magnetic encoder tracks 1, 2 are more than 0.5 mm. This leads to formation of smaller demagnetizing field inside the respective magnetic encoder tracks. This also leads to lower chance of causing irreversible flux loss at high temperatures, thereby resulting in improved reliability as a magnet. Furthermore, the respective thicknesses t1 of the magnetic encoder tracks 1, 2 are less than 4 mm. This enables a sufficient amount of flux for magnetization to pass through the magnetic encoder tracks 1, 2. The length L of each magnetic pole is in the range of 0.3 mm to 5 mm. Preferably, the track width W and a magnetic pole length L satisfy the relationship of W>L. This can minimize the unwanted effects of possible errors brought by the interference of magnetism between the plural rows of magnetic encoder tracks 1, 2. Also, the magnetic pole length L being in the range of 0.3 mm to 5 mm enables necessary and sufficient detection of magnetic signals of the respective magnetic encoder tracks 1, 2.

The second embodiment through the sixteenth embodiment of the present invention will be hereinafter described. Note that those features corresponding to the features already described with reference to the preceding embodiments will be given the same reference signs and will not be described. In the discussion of a given configuration where only certain features are described, the remaining non-described features should be considered as the same as those already described with reference to the preceding embodiments. Also note that beside the combinations of the features described in detail with reference to a certain embodiment, various embodiments themselves can be partially combined with each other unless such combinations are inoperable.

FIGS. 3A and 3B show the second embodiment. A magnetic encoder as shown in FIGS. 3A and 3B includes plural rows (two rows in the illustrated example) of magnetic encoder tracks 1, 2 that are arranged adjacent to each other and are formed integrally with the magnetic encoder. One magnetic encoder track 1 of the magnetic encoder tracks 1, 2 has a track width W that is different from the track width W of the other magnetic encoder track 2. This provides freedom in arrangement of sensors that are associated with respective magnetic encoder tracks 1, 2, thereby facilitating the incorporation of a magnetic encoder ME and sensors into various devices.

Figure 4A:
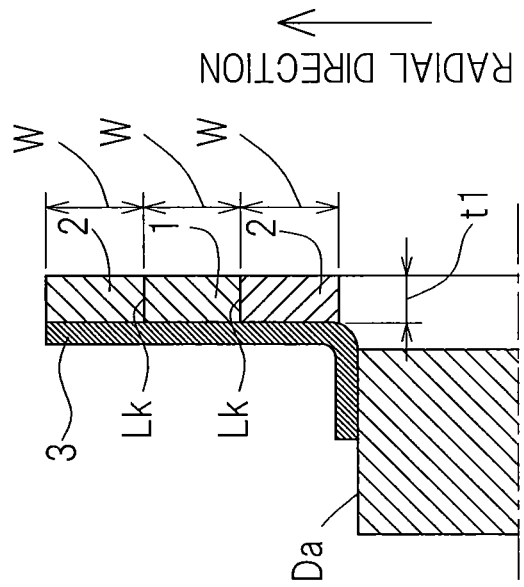
FIG. 4A shows a longitudinal cross sectional view of a radial-type magnetic encoder according to the third embodiment of the present invention.
Figure 4B:
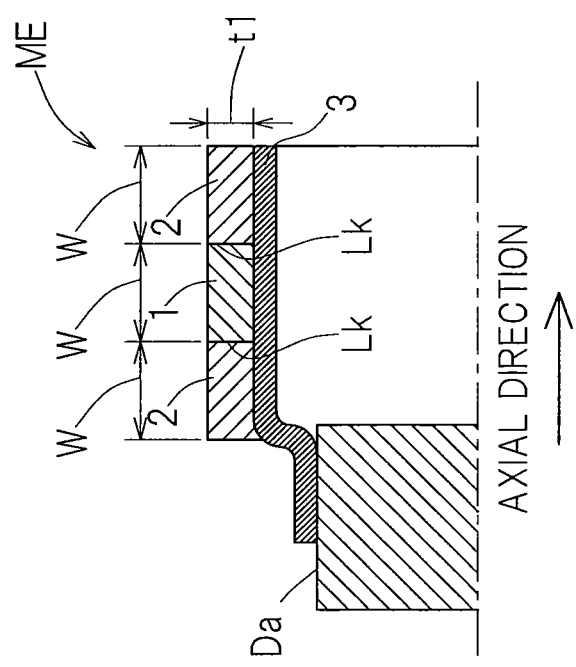
FIG. 4B shows a longitudinal cross sectional view of an axial-type magnetic encoder according to the third embodiment of the present invention.
Figure 5:
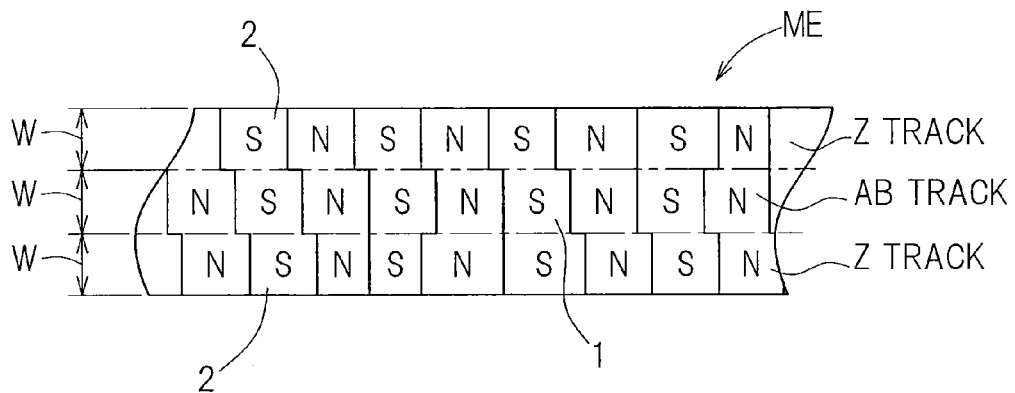
FIG. 5 shows the magnetic patterns magnetized to the magnetic encoder.

As in the third embodiment shown in FIGS. 4A, 4B and 5, the magnetic encoder ME may include three or more rows of magnetic encoder tracks that are arranged adjacent to each other and are formed integrally with the magnetic encoder, such. For example, the magnetic encoder ME may include a plurality of Z tracks. Use of the resulting signals enables more intricate detection of rotation.

Figure 6A:
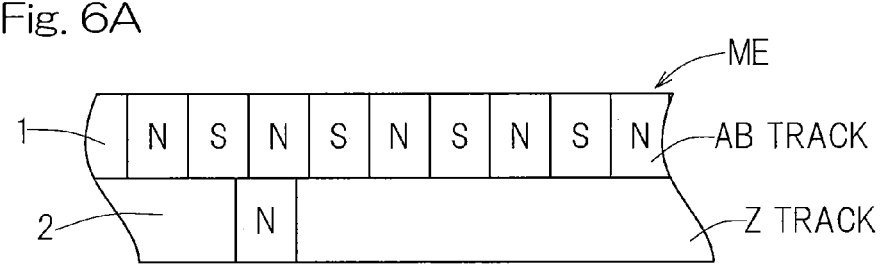
FIG. 6A shows an example of the magnetic patterns magnetized to a magnetic encoder according to the fourth embodiment of the present invention.
Figure 6B:
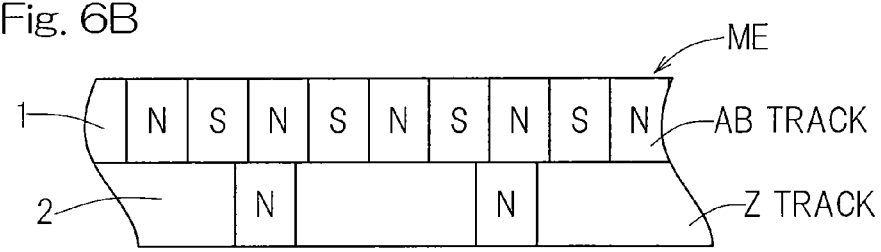
FIG. 6B shows another example of the magnetic patterns magnetized to a magnetic encoder according to the fourth embodiment of the present invention.
Figure 6C:
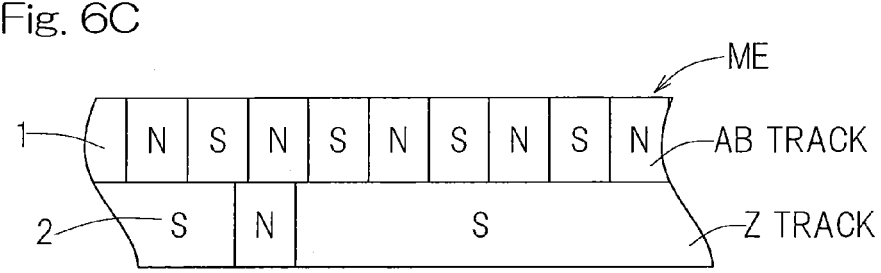
FIG. 6C shows yet another example of the magnetic patterns magnetized to a magnetic encoder according to the fourth embodiment of the present invention.

The fourth embodiment will be described in connection with FIG. 6A to FIG. 6C. As shown in FIGS. 6A and 6B, the magnetic encoder ME includes plural rows (two rows in the illustrated example) of magnetic encoder tracks 1, 2, where Z track(s) may only include at certain circumferential location one type of magnetic pole, for example, an N magnetic pole formed thereon. The remaining circumferential locations of the Z track may be un-magnetized. As shown in FIG. 6C, Z track may only include at certain circumferential location one type of magnetic pole, for example, an N magnetic pole formed thereon, with the other circumferential locations having a magnetic pole formed thereon which is an opposite pole to the magnetic pole on the certain circumferential location.

Figure 7:
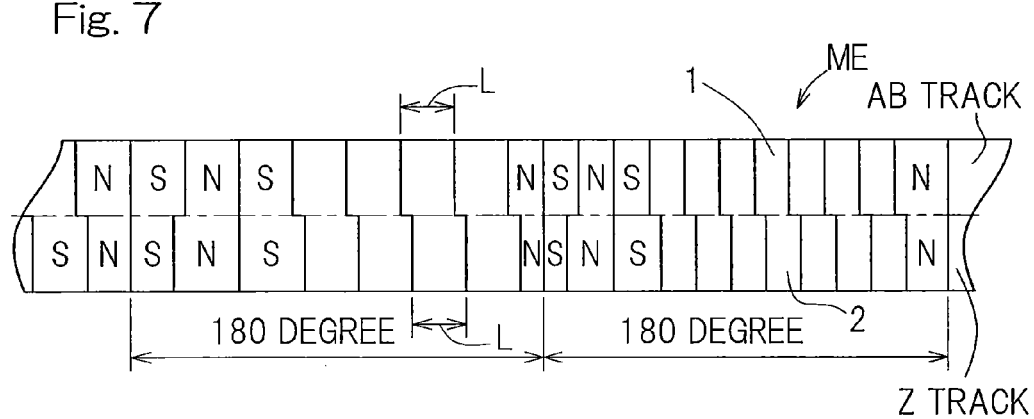
FIG. 7 shows an example of the magnetic patterns magnetized to a magnetic encoder according to the fifth embodiment of the present invention.

Such as in the fifth embodiment shown in FIG. 7, the magnetic pole length L may vary after every certain angle (180° in the illustrated example) of a magnetic encoder ME to provide different intervals between signals for detection of position. In this embodiment, a reference signal is provided at least one time per 180°. Such a magnetic encoder ME provides a reference signal every time the interval between signals for detection of position changes, thereby facilitating more intricate detection of position.

Figure 8:
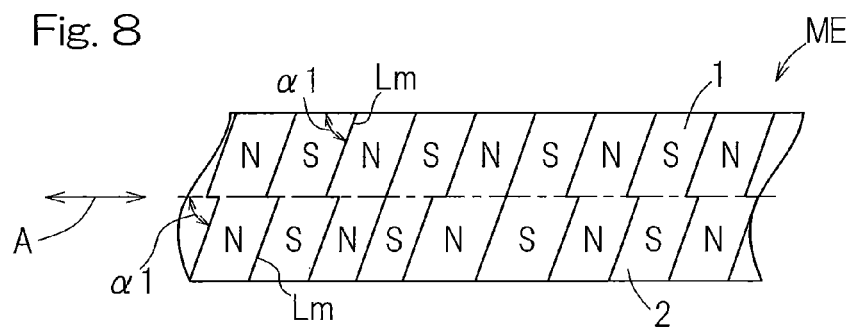
FIG. 8 shows an example of the magnetic patterns magnetized to a magnetic encoder according to the sixth embodiment of the present invention.

Such as in the sixth embodiment shown in FIG. 8, the borderlines Lm defining the distribution of magnetization, or the borderlines Lm between magnetic poles may be non-perpendicular with respect to the direction of rotation of a magnetic encoder ME, so as to have respective fixed slant angles $\alpha 1$ with respect to the direction of rotation as depicted by an arrow A.

Figure 9A:
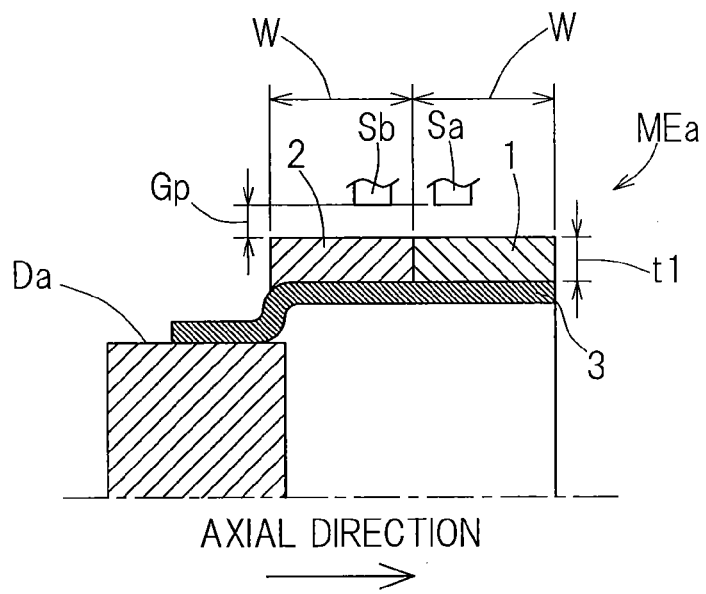
FIG. 9A shows a longitudinal cross sectional view of a radial-type magnetic encoder according to the seventh embodiment of the present invention.
Figure 9B:
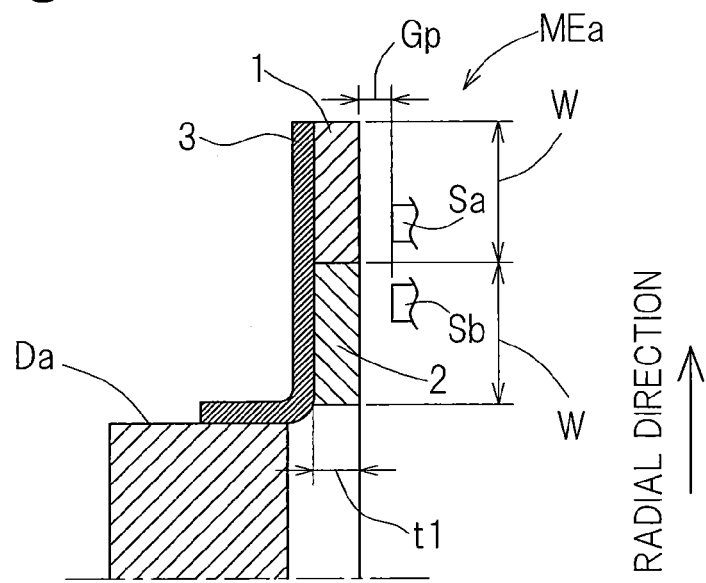
FIG. 9B shows a longitudinal cross sectional view of an axial-type magnetic encoder according to the seventh embodiment of the present invention.
Figure 10:
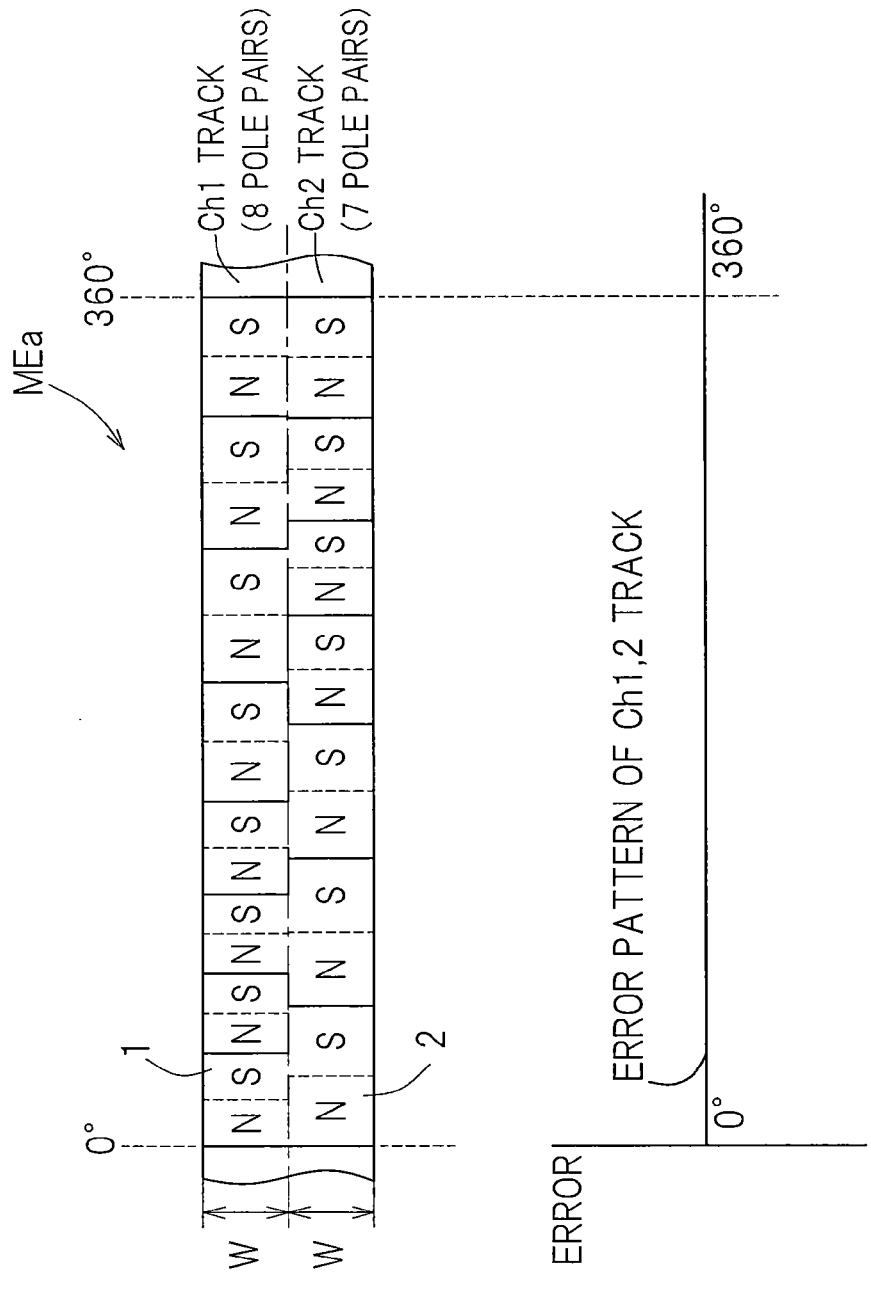
FIG. 10 shows an example of the magnetic patterns magnetized to plural rows of magnetic encoder tracks of the magnetic encoder, where the magnetic encoder tracks are arranged in neighboring relation.

In the seventh embodiment shown in FIG. 9A, FIG. 9B and FIG. 10, a magnetic encoder MEa includes plural rows of annular magnetic encoder tracks 1, 2 that are arranged adjacent to each other and are formed integrally with the magnetic encoder MEa, with the magnetic encoder tracks 1, 2 including respective magnetic patterns magnetized thereto having different numbers of magnetic poles. The magnetic encoder MEa is configured to be employed spaced through an air gap Gp of, for example, 1 mm. For simplicity, the plural rows of magnetic encoder tracks 1, 2 are assumed to include a Ch1 track and a Ch2 track, with the Ch1 track including eight pairs of magnetic poles and the Ch2 track including seven pairs of magnetic poles.

Figure 11A:
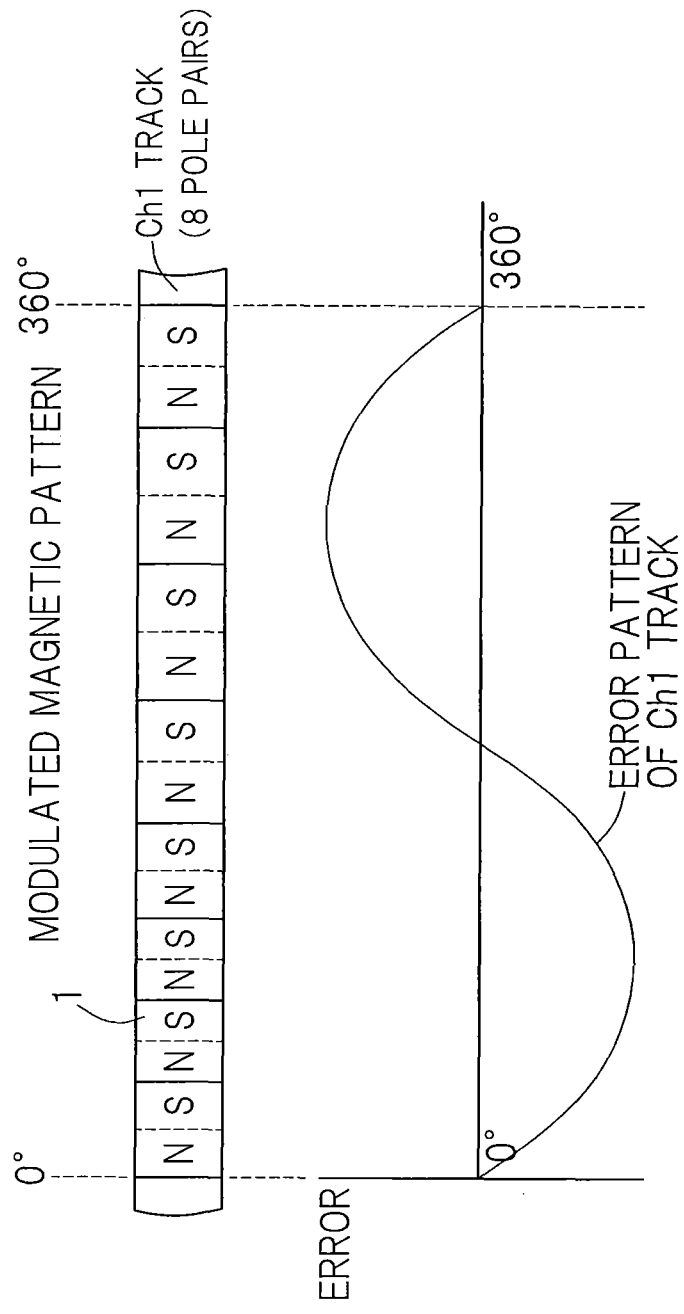
FIG. 11A shows the magnetic pattern magnetized to one of the magnetic encoder tracks of the magnetic encoder, together with its error pattern.
Figure 11B:
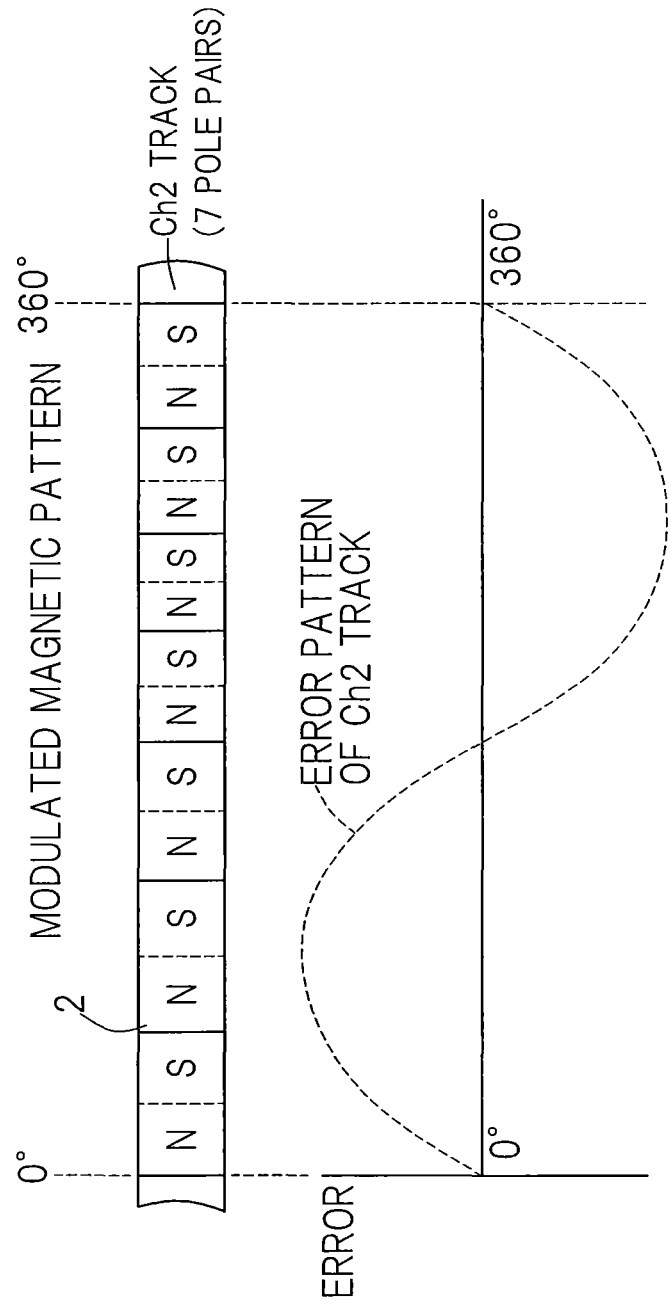
FIG. 11B shows the magnetic pattern magnetized to the other magnetic encoder track of the magnetic encoder tracks of the magnetic encoder, together with its error pattern.
Figure 25:
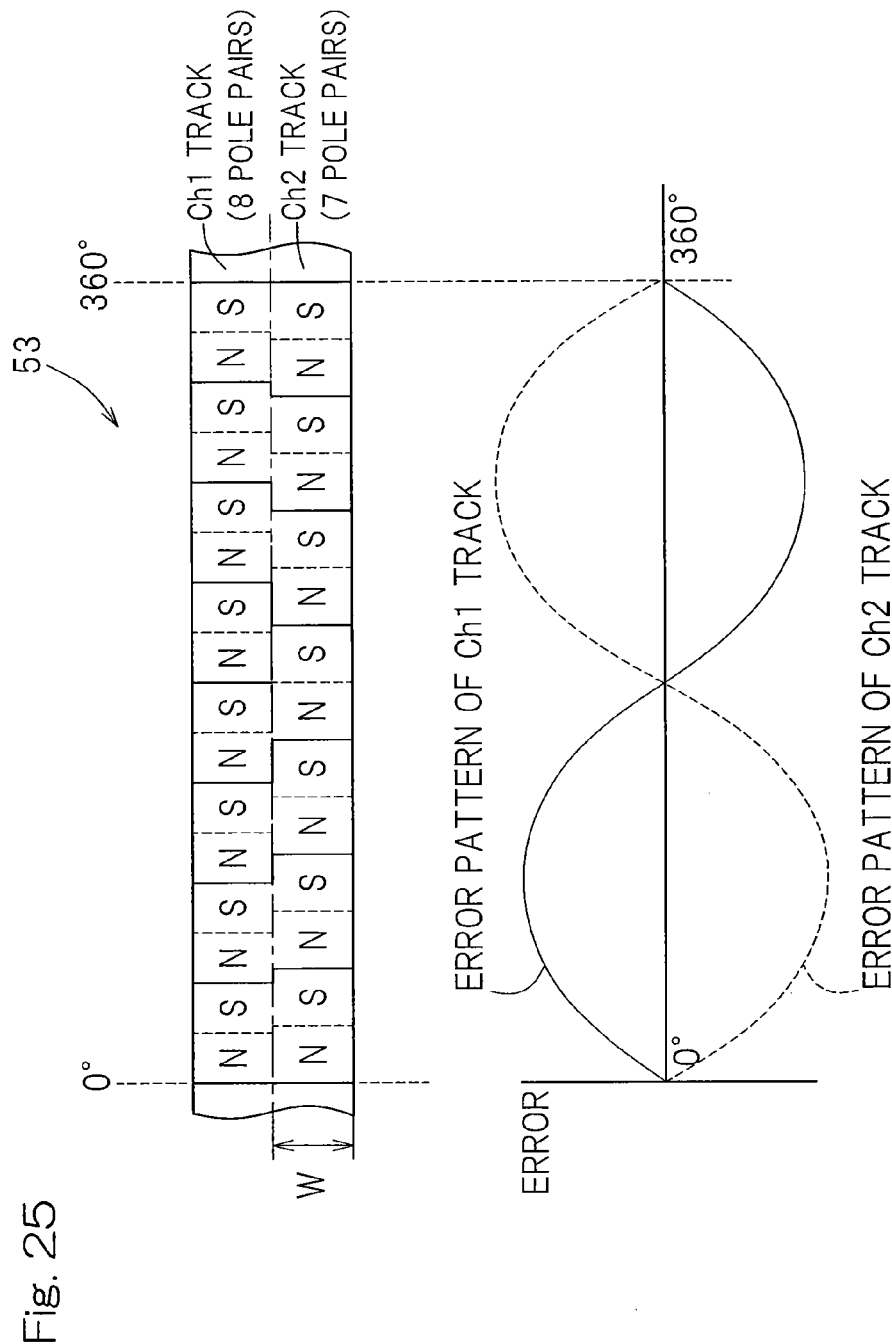
FIG. 25 shows the magnetic patterns magnetized to the magnetic encoder, together with their error patterns.

Among the plural rows of magnetic encoder tracks 1, 2, the Ch1 track as shown in FIG. 11A contains an error pattern that is inverse to the error pattern contained in the Ch1 track shown in FIG. 25, and the Ch2 track as shown in FIG. 11B contains an error pattern that is inverse to the error pattern contained in the Ch2 track shown in FIG. 25. When each of the Ch1 track and the Ch2 track as shown in FIG. 11A and FIG. 11B, respectively, is assumed to be present by itself, each track exhibits a cyclic error pattern. When the Ch1 track and the Ch2 track are brought close to each other such as shown in FIG. 10, magnetism of the Cha track and the Ch2 track interferes with each other, thereby generally cancelling their error patterns and eliminating the errors. A final product would have a characteristic that the magnetic patterns would be detected and measured by sensors Sa, Sb at positions that correspond to a desired air gap Gp of 1 mm as equal pitch magnetic patterns. Cyclic error patterns would appear at locations that do not correspond to a desired air gap Gp of 1 mm, such as at surfaces of the magnetic encoder MEa.

As has been discussed, magnetism of plural rows of magnetic encoder tracks 1, 2 interferes with each other, thereby generally canceling their error patterns and eliminating the errors. This allows reduction in the size of a magnetic encoder MEa and also allows improvement in precision performance of the magnetic encoder MEa, without the need to complicate the construction of the magnetic encoder MEa.

The seventh embodiment has been described assuming: that the air gap Gp is 1 mm; that the Ch1 track has eight pairs of magnetic poles; and that the Ch2 track has seven pairs of magnetic poles. However, the present invention is not necessarily limited to these values; the magnetic encoder tracks 1, 2 may be magnetized to have any configuration as long as, with a selected value for the desired air gap Gp and a selected value for a desired number of magnetic pole pairs, the magnitude of possible errors brought by the interference of magnetism as well as error patterns are generally cancelled out. For instance, when the Ch1 track has thirty-two pairs of magnetic poles and the Ch2 track has twenty-eight pairs of magnetic poles, the number of magnetic pole pairs in every 90° is eight and seven, respectively. Since in this case the above discussed and illustrated error patterns repeat four times per complete rotation, the corresponding four times of modulation may be made to the magnetic patterns. Moreover, both rows of the magnetic encoder tracks 1, 2 do not necessarily have to be modulated; only one of the magnetic encoder tracks 1, 2, that particularly needs to have precision performance, may be modulated.

When the air gap Gp has a value of other than 1 mm, the degree of modulation made to the magnetic pattern may be increased with the increase of the air gap Gp. This enables the implementation of the magnetic encoder MEa with any given desired air gap Gp, thereby achieving increased design freedom. In other words, this implies less limitations in the incorporation of a magnetic encoder MEa and sensors Sa, Sb into, for example, a device of interest, thereby enhancing the versatility of a magnetic encoder MEa. Moreover, this eliminates the need to separate or makes it optional to separate the plural rows of magnetic encoder tracks 1, 2 or to insert, for example, a magnetic material between the tracks 1, 2. In this way, the construction of a magnetic encoder MEa can be simplified, thereby leading to reduction in the production cost of the magnetic encoder MEa. Furthermore, this eliminates the need to increase or makes it optional to increase a space between sensors Sa, Sb that read signals of plural rows of magnetic encoder tracks 1, 2, thereby leading to reduction in the size of the device as a whole, inclusive of a magnetic encoder MEa and sensors Sa, Sb.

Figure 12A:
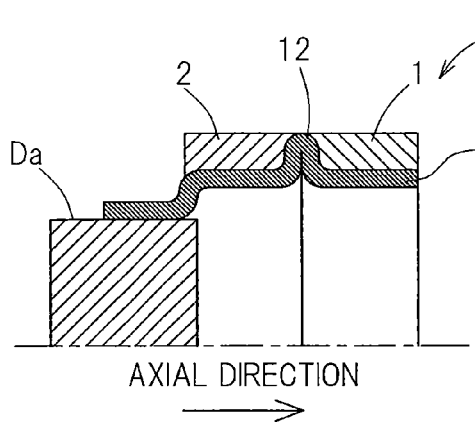
FIG. 12A shows a longitudinal cross sectional view of a radial-type magnetic encoder according to the eighth embodiment of the present invention.
Figure 12B:
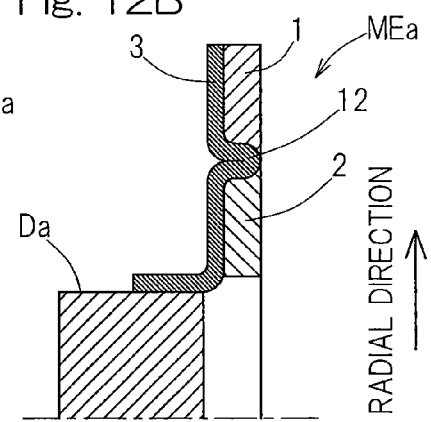
FIG. 12B shows a longitudinal cross sectional view of an axial-type magnetic encoder according to the eighth embodiment of the present invention.

Such as in the eighth embodiment shown in FIGS. 12A and 12B, a construction may be employed which includes a spacer 12 made of a magnetic material interposed between the plural rows of magnetic encoder tracks 1, 2. Such a spacer 12 made of a magnetic material short-circuits possible stray magnetic field emanating from the magnetic encoder tracks 1, 2 and reduces the interference of magnetism between the magnetic encoder tracks 1, 2, thereby realizing the magnetic encoder MEa having improved precision performance.

Figure 13A:
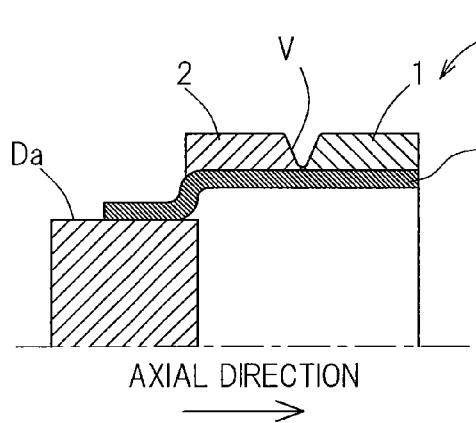
FIG. 13A shows a longitudinal cross sectional view of a radial-type magnetic encoder according to the ninth embodiment of the present invention.
Figure 13B:
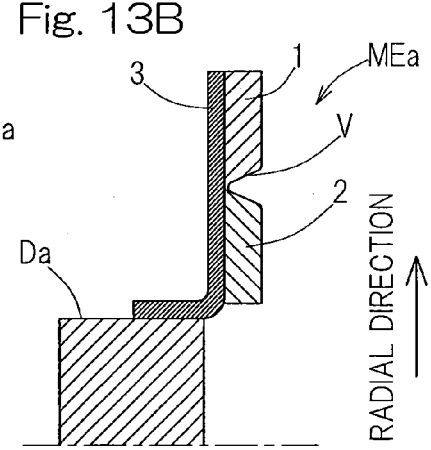
FIG. 13B shows a longitudinal cross sectional view of an axial-type magnetic encoder according to the ninth embodiment of the present invention.

Such as in the ninth embodiment shown in FIGS. 13A and 13B, a construction may be employed which includes a groove V provided between the plural rows of magnetic encoder tracks 1, 2. The groove V is formed to have a V-shaped cross section having a width that narrows towards a bottom of the groove V. The groove V can further reduce possible mutual influence in a magnetization process as well as the interference of magnetism at the detection by the sensors Sa, Sb (FIGS. 9A and 9B), thereby realizing a magnetic encoder MEa having improved precision performance. Such a groove V that has a V-shaped cross section having a width that narrows towards a bottom of the groove V can ensure the separation of the respective surfaces of the adjacent magnetic encoder tracks 1, 2 from each other. This realizes a plural-row, the magnetic encoder MEa having precision performance that is higher than those shown in FIGS. 9A and 9B. The shape of the groove V is not limited to a V-shaped cross section and may be, for example, a U-shaped cross section.

Figure 14A:
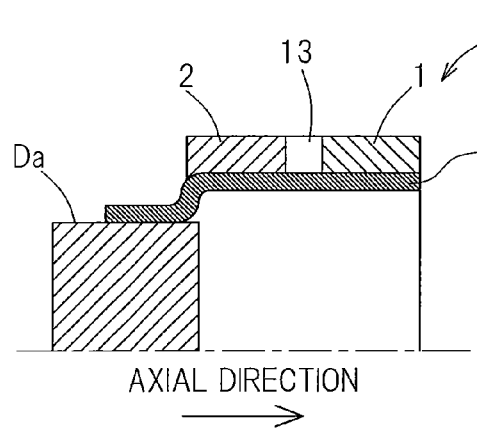
FIG. 14A shows a longitudinal cross sectional view of a radial-type magnetic encoder according to the tenth embodiment of the present invention.
Figure 14B:
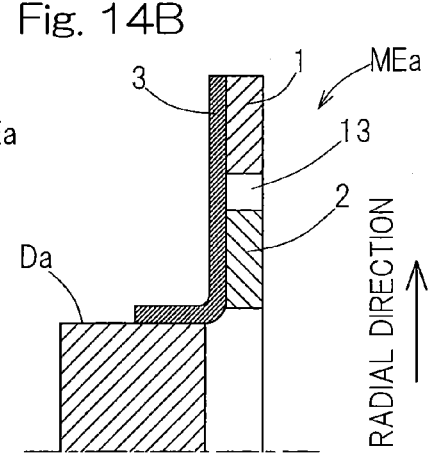
FIG. 14B shows a longitudinal cross sectional view of an axial-type magnetic encoder according to the tenth embodiment of the present invention.

Such as in the tenth embodiment shown in FIGS. 14A and 14B, an annular member 13 that includes non-magnetized segment(s) may be interposed between the plural rows of magnetic encoder tracks 1, 2. Such an annular member 13 can ensure the separation of the respective surfaces of the adjacent magnetic encoder tracks 1, 2 from each other. This realizes a plural-row, the magnetic encoder MEa having precision performance that is higher than those shown in FIGS. 9A and 9B.

Figure 15A:
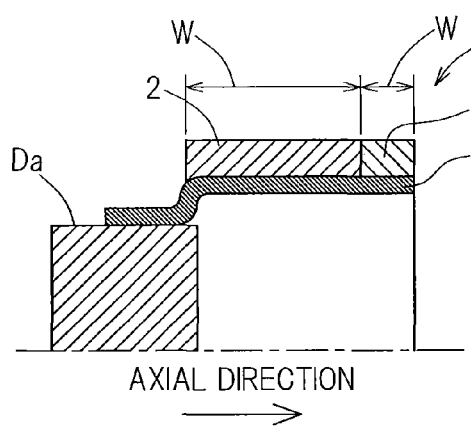
FIG. 15A shows a longitudinal cross sectional view of a radial-type magnetic encoder according to the eleventh embodiment of the present invention.
Figure 15B:
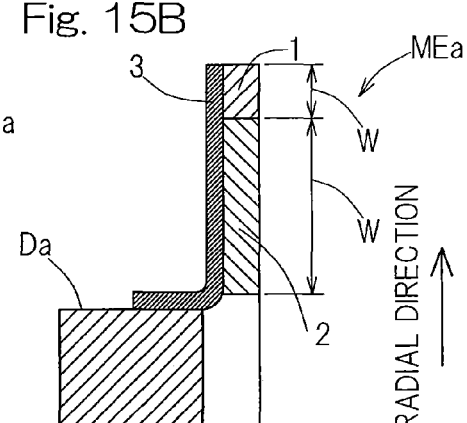
FIG. 15B shows a longitudinal cross sectional view of an axial-type magnetic encoder according to the eleventh embodiment of the present invention.

Such as in the eleventh embodiment shown in FIGS. 15A and 15B, one magnetic encoder track 1 may have a track width W that is different from the track width W of the other magnetic encoder track 2. This provides freedom in arrangement of sensors that are associated with respective magnetic encoder tracks 1, 2, thereby facilitating the incorporation of the magnetic encoder MEa and sensors into various devices.

Figure 16A:
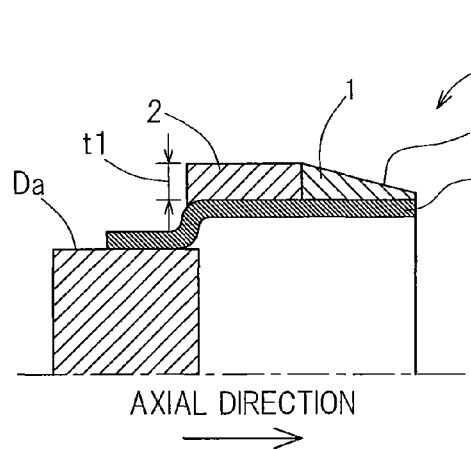
FIG. 16A shows a longitudinal cross sectional view of a radial-type magnetic encoder according to the twelfth embodiment of the present invention.
Figure 16B:
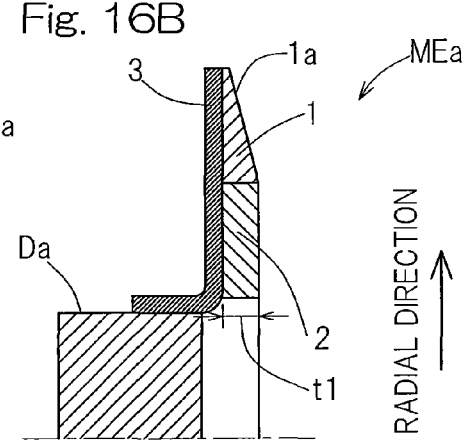
FIG. 16B shows a longitudinal cross sectional view of an axial-type magnetic encoder according to the twelfth embodiment of the present invention.

Such as in the twelfth embodiment shown in FIGS. 16A and 16B, one magnetic encoder track 1 may have a track surface extending on a plane that is different from a plane on which a track surface of the other magnetic encoder track 2 extends. In FIG. 16A, the track surface 1a of the magnetic encoder track 1 which is closer to an axially distal end of a magnetic encoder is formed to be such an inclined surface that the track thickness t1 of the magnetic encoder track 1 decreases towards the axially distal end. In FIG. 16B, the track surface 1a of the magnetic encoder track 1 which is closer to an outer diameter side of the magnetic encoder is formed to be such an inclined surface that the track thickness t1 of the magnetic encoder track 1 decreases towards the outer diameter side.

Figure 17A:
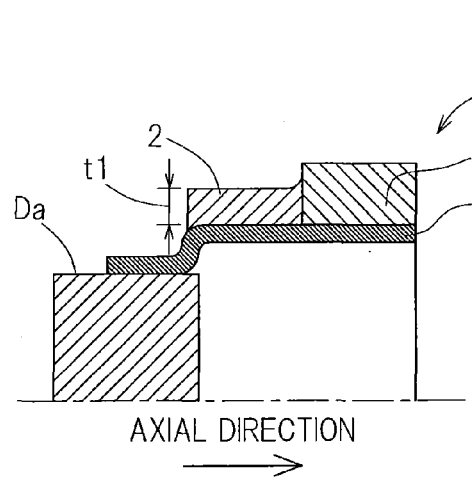
FIG. 17A shows a longitudinal cross sectional view of a radial-type magnetic encoder according to the thirteenth embodiment of the present invention.
Figure 17B:
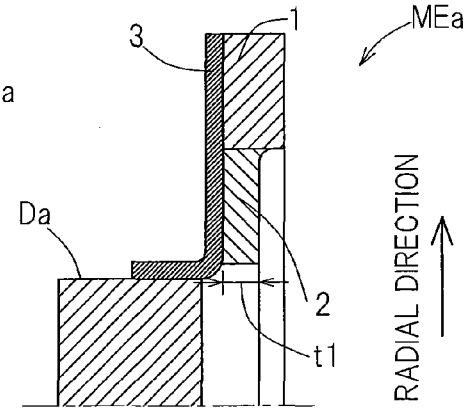
FIG. 17B shows a longitudinal cross sectional view of an axial-type magnetic encoder according to the thirteenth embodiment of the present invention.

Such as in the thirteenth embodiment shown in FIGS. 17A and 17B, the entirety of the magnetic encoder track 2 which is closer to an axially proximate end of the magnetic encoder has a thickness that is smaller than the thickness of the magnetic encoder track 1 which is closer to an axially distal end of the magnetic encoder. In FIG. 17B, the entirety of the magnetic encoder track 2 which is closer to an inner diameter side of the magnetic encoder has a thickness that is smaller than the thickness of the magnetic encoder track 1 which is closer to an outer diameter side of the magnetic encoder. The magnetic encoders MEa as shown in FIGS. 16A and 16B as well as the magnetic encoders MEa as shown in FIGS. 17A and 17B include the plural rows of magnetic encoder tracks 1, 2 that include respective detected surfaces extending on different planes. This allows for provision of difference in magnetization strength between respective rows of magnetic encoder tracks 1, 2, thereby facilitating control of the interference of magnetism between the plural rows of magnetic encoder tracks 1, 2.

Such as in the fourteenth embodiment shown in FIGS. 18A and 18B or the fifteenth embodiment shown in FIG. 19, the magnetic encoder MEa may include three or more rows of magnetic encoder tracks that are arranged adjacent to each other and are formed integrally with the magnetic encoder MEa. In the example under discussion, the magnetic encoder MEa includes a Ch1 track having eight pairs of magnetic poles, a Ch2 track having seven pairs of magnetic poles, and a Ch3 track having six pairs of magnetic poles, with the Ch1, Ch2, and Ch3 tracks being arranged in this order as shown in FIG. 19. Use of the resulting signals enables more intricate detection of rotation.

Such as in the sixteenth embodiment shown in FIG. 20, the borderlines Lm defining the distribution of magnetization, or the borderlines Lm between magnetic poles may be non-perpendicular with respect to the direction of rotation of the magnetic encoder MEa, so as to have respective fixed slant angles $\alpha 1$ with respect to the direction of rotation as depicted by an arrow A.

Although the preceding embodiments have been discussed with reference to a rotational magnetic encoder that includes annular magnetic encoder tracks, the present invention is not limited to such a rotational magnetic encoder. For example, a linear (linear motion) encoder, which may be used to detect the position of a moving element in a linear motion mechanism such as a movable table, may include magnetic patterns according to any one of the preceding embodiments (i.e. Diagram (A) of FIG. 2, Diagram (B) of FIG. 2 and FIG. 5) to form a plural-row magnetic encoder. Such a magnetic encoder can also achieve the same effect or advantage as a magnetic encoder according to any one of the preceding embodiments.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS 1, 2: Magnetic encoder track
Gp: Air gap
ME, MEa: Magnetic encoder
Pa, Pb: Magnetized magnetic pattern
Psa, Psb: To-be-detected magnetic pattern
Sa, Sb: Sensor
W: Track width

What is claimed is:

1. A magnetic encoder including plural rows of annular magnetic encoder tracks arranged adjacent to each other, each of the plural rows of magnetic encoder tracks being configured to be read by a corresponding sensor, comprising:
an AB magnetic encoder track including a magnetic pattern having N poles and S poles arranged in alternate fashion magnetized thereto to generate magnetic signals for detection of rotation; and
a Z magnetic encoder track that is different from the AB magnetic encoder track, the Z magnetic encoder track being adjacent to the AB magnetic encoder track and the Z magnetic encoder track providing a reference position for rotation,
each of the AB magnetic encoder track and the Z magnetic encoder track being configured to be employed spaced through an air gap from the corresponding sensors that read magnetic signals of each of the respective magnetic encoder tracks,
the magnetic pattern magnetized to the AB magnetic encoder track being configured to have an unequal pitch such that a magnetic pattern of the magnetic signal acting on and read by the corresponding sensor is, under an interference of magnetisms of the AB magnetic encoder track and the Z magnetic encoder track, detected by the corresponding sensor as an equal pitch magnetic pattern.

2. The magnetic encoder as claimed in claim 1, wherein a magnetic pattern magnetized to the Z magnetic encoder track has the same number of magnetic poles as the AB magnetic encoder track, and a phase offset with respect to the magnetic pattern magnetized to the AB magnetic encoder track, and
the Z magnetic encoder track is configured to provide, by the use of the phase offset with respect to the magnetic pattern magnetized to the AB magnetic encoder track, the reference position for rotation.

3. The magnetic encoder as claimed in claim 1, wherein a magnetic pattern magnetized to the Z magnetic encoder track has an N or S magnetic pole at a certain circumferential location with the remaining circumferential portion being not magnetized.

4. The magnetic encoder as claimed in claim 1, wherein a magnetic pattern magnetized to the Z magnetic encoder track includes an N or S magnetic pole at a certain circumferential location as well as a magnetic pole, which is an opposite magnetic pole to the magnetic pole on the certain circumferential location, at a different circumferential location.

5. The magnetic encoder as claimed in claim 1, wherein each of the magnetic encoder tracks is formed to have a track width, as measured along arrangement direction of the magnetic encoder tracks, in the range of 1 mm to 5 mm.

6. The magnetic encoder as claimed in claim 1, wherein the plural rows of magnetic encoder tracks are adjacent through a boundary line, the magnetic encoder being configured to be employed spaced from the sensors through an air gap that is more than 0.3 mm and is less than 4 mm, the sensors having respective detector portions positioned over the respective magnetic encoder tracks at locations spaced from the boundary line towards the respective magnetic encoder tracks by respective distances in the range of 0.5 mm to 3 mm.

7. The magnetic encoder as claimed in claim 1, wherein at least one of the magnetic encoder tracks includes a ferrite sintered magnet or a magnet containing a ferrite power mixed in a rubber or a resin, and has a thickness that is more than 0.5 mm and is less than 4 mm.

8. The magnetic encoder as claimed in claim 1, wherein the magnetic pattern magnetized to the AB magnetic encoder track includes magnetic poles, each having a length L as measured along a circumferential direction of the magnetic encoder track, the length L being in the range of 0.3 mm to 5 mm, and
wherein each of the magnetic encoder tracks is so formed that the length L has a relationship with a track width W, as measured along arrangement direction of the magnetic encoder tracks, of W>L.

9. The magnetic encoder as claimed in claim 1, further comprising a magnetic material interposed between the plural rows of the adjacent magnetic encoder tracks.

10. The magnetic encoder as claimed in claim 1, further comprising a core having the plural rows of magnetic encoder tracks disposed thereon, the plural rows of the adjacent magnetic encoder tracks having a gap interposed therebetween.

11. The magnetic encoder as claimed in claim 1, wherein the AB magnetic encoder track has a track width as measured along arrangement direction of the magnetic encoder tracks, and the Z magnetic encoder track has a track width, as measured along an arrangement direction of the magnetic encoder tracks, different from the track width of the AB magnetic encoder track.

12. The magnetic encoder as claimed in claim 1, wherein the plural rows of the adjacent magnetic encoder tracks include respective to-be-detected surfaces extending on different planes.

13. A magnetic encoder including plural rows of linear magnetic encoder tracks arranged adjacent to each other, each of the plural rows of magnetic encoder tracks being configured to be read by a corresponding sensor, comprising:
an AB magnetic encoder track including a magnetic pattern magnetized thereto to generate magnetic signals for detection of position, the magnetized magnetic pattern including N poles and S poles arranged in alternate fashion; and
a Z magnetic encoder track that is different from the AB magnetic encoder track, the Z magnetic encoder track being adjacent to the AB magnetic encoder track and the Z magnetic encoder track providing a reference position,
each of the AB magnetic encoder track and the Z magnetic encoder track being configured to be employed spaced through an air gap from the corresponding sensors that read magnetic signals of each of the respective magnetic encoder tracks,
the magnetic pattern magnetized to the AB magnetic encoder track being configured to have an unequal pitch such that a magnetic pattern of the magnetic signal acting on and read by the corresponding sensor is, under the interference of magnetisms of the AB magnetic encoder track and the Z magnetic encoder track, detected by the corresponding sensor as an equal pitch magnetic pattern.

* * * * *